(12) United States Patent
Sengbusch et al.

(10) Patent No.: US 11,728,055 B2
(45) Date of Patent: Aug. 15, 2023

(54) SYSTEM AND METHOD FOR PERFORMING ACTIVE SCANNING OF A NUCLEAR FUEL ROD

(71) Applicant: SHINE TECHNOLOGIES, LLC, Janesville, WI (US)

(72) Inventors: Evan R. Sengbusch, Monona, WI (US); Arne V. Kobernik, Monona, WI (US); Eli C. Moll, Monona, WI (US); Christopher M. Seyfert, Monona, WI (US); Ross F. Radel, Monona, WI (US); Mark Thomas, Monona, WI (US); Jake Hecla, Monona, WI (US)

(73) Assignee: SHINE TECHNOLOGIES, LLC, Janesville, WI (US)

( * ) Notice: Subject to any disclaimer, the term of this patent is extended or adjusted under 35 U.S.C. 154(b) by 240 days.

(21) Appl. No.: 17/152,008

(22) Filed: Jan. 19, 2021

(65) Prior Publication Data

US 2021/0280329 A1     Sep. 9, 2021

Related U.S. Application Data

(63) Continuation of application No. 15/618,590, filed on Jun. 9, 2017, now Pat. No. 10,896,768.

(Continued)

(51) Int. Cl.
    *G21C 17/06*     (2006.01)
    *G21G 4/02*     (2006.01)
    (Continued)

(52) U.S. Cl.
    CPC ............ *G21C 17/06* (2013.01); *G21C 19/00* (2013.01); *G21G 4/02* (2013.01); *G21B 1/00* (2013.01); *G21C 3/326* (2013.01)

(58) Field of Classification Search
    CPC ........... G21C 17/06; G21C 19/00; G21G 4/02
    (Continued)

(56) References Cited

U.S. PATENT DOCUMENTS

| | | |
|---|---|---|
| 3,636,353 A | 1/1972 | Untermyer |
| 3,707,631 A | 12/1972 | Untermyer |

(Continued)

FOREIGN PATENT DOCUMENTS

| | | |
|---|---|---|
| JP | 646849 | 1/1989 |
| JP | 02-222885 | 9/1990 |

(Continued)

OTHER PUBLICATIONS

International Search Report and Written Opinion for corresponding International Application No. PCT/US2017/036744, dated Mar. 23, 2018, 14 pages.

(Continued)

*Primary Examiner* — Jack W Keith
*Assistant Examiner* — Daniel Wasil
(74) *Attorney, Agent, or Firm* — CASIMIR JONES, S.C.; Brian F. Bradley

(57) ABSTRACT

A system and method for performing active scanning on a nuclear fuel rod are provided. The system includes an electrically-driven neutron generator including an ion source, an accelerator, and a target; a moderator surrounding the neutron generator and configured to moderate neutrons generated by the neutron generator; a fuel rod channel disposed within the moderator, the fuel rod channel configured to receive a nuclear fuel rod and subject the nuclear fuel rod to a predetermined neutron flux; and a plurality of radiation detectors. When the nuclear fuel rod is subjected to the predetermined neutron flux, neutrons induce a secondary radiation of prompt and delayed gamma emissions, neutron emission, or a combination thereof that are detected by the (Continued)

plurality of radiation detectors to determine an amount of fissile material in the nuclear fuel rod and a spatial distribution of the fissile material along a length of the nuclear fuel rod.

18 Claims, 16 Drawing Sheets

Related U.S. Application Data

(60) Provisional application No. 62/347,969, filed on Jun. 9, 2016.

(51) Int. Cl.
*G21C 19/00* (2006.01)
*G21B 1/00* (2006.01)
*G21C 3/326* (2006.01)

(58) Field of Classification Search
USPC .......................................... 376/159, 254, 257
See application file for complete search history.

(56) References Cited

U.S. PATENT DOCUMENTS

| | | |
|---|---|---|
| 3,728,544 A | 4/1973 | Untermyer |
| 3,755,675 A | 8/1973 | Stepan et al. |
| 3,786,256 A | 1/1974 | Untermyer |
| 3,796,876 A | 3/1974 | Krinninger |
| 4,902,467 A * | 2/1990 | Schoenig .............. G21C 17/06 376/159 |
| 4,902,647 A | 2/1990 | Chutjian |
| 7,342,988 B2 | 3/2008 | Leung |
| 2002/0131542 A1 | 9/2002 | Leunig |
| 2007/0237281 A1 | 10/2007 | Yakovlyev |
| 2010/0284504 A1 | 11/2010 | Le Tourneur |
| 2013/0129027 A1 | 5/2013 | Harris et al. |

FOREIGN PATENT DOCUMENTS

| | | |
|---|---|---|
| JP | 04-289497 | 10/1992 |
| JP | 2008-202942 | 9/2008 |
| KR | 20100076487 | 7/2010 |
| KR | 20100119194 | 11/2010 |
| WO | 2009142669 | 11/2009 |
| WO | 2011081940 | 7/2011 |
| WO | 2015006065 | 1/2015 |
| WO | 2015199770 | 12/2015 |

OTHER PUBLICATIONS

Extended Search Report of related EP 17858843.0, dated Feb. 3, 2020, 9 pages.

* cited by examiner

SYSTEM AND METHOD FOR PERFORMING ACTIVE SCANNING OF A NUCLEAR FUEL ROD

CROSS-REFERENCE TO RELATED APPLICATIONS

The present application is a continuation of U.S. patent application Ser. No. 15/618,590, filed 9 Jun. 2017, which claims priority to U.S. Provisional Patent Application Ser. No. 62/347,969 filed 9 Jun. 2016, each of which is herein incorporated by reference in its entirety.

FIELD

The present application relates generally to the field of performing active scanning of a nuclear fuel rod to identify variations in enrichment along a length of the fuel rod. More specifically, the present application relates to systems and methods for performing active scanning of a nuclear fuel rod.

BACKGROUND INFORMATION

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Approximately 20% of the electrical power in the United States is generated by nuclear reactors. The fuel used in these nuclear reactors comes in the form of small cylindrical pellets of uranium dioxide ($UO_2$), which are approximately 1 cm (0.39 inches) long and 1 cm (0.39 inches) in diameter. The useful fuel in these pellets is the uranium, specifically U-235 and U-238. The $UO_2$ pellets are stacked inside a metal sheath to form a fuel rod ranging in length from about 152.4 cm (60 inches) to 406.4 cm (160 inches). A plurality of fuel rods are then arranged into rectangular bundles of approximately 15×15 fuel rods per bundle. A typical nuclear reactor will utilize between 150 and 200 bundles, equating to about 40,000 fuel rods or about 15 million fuel pellets.

Nuclear reactors are refueled approximately every two years. During each refueling, approximately one-third of the fuel rods are replaced. Thus, the average life of a fuel rod is about six years. Significant effort has been put into extending the lifetime of nuclear fuel. One method that has proved very effective is to introduce "burnable poisons" into the fuel pellets. Typical examples of burnable poisons are gadolinium and boron. These materials are called poisons because they are very effective at absorbing thermal neutrons. Thermal neutrons are typically defined as neutrons with energy less than about 0.5 eV.

Nuclear reactors get energy from nuclear fission, that is, the splitting of atoms (e.g., uranium atoms) and utilizing the released energy to heat water. The interaction of neutrons with the uranium in the nuclear fuel is what induces a fission reaction, and each fission reaction emits several neutrons which generate more fission reactions, hence the critical ("chain reaction") operational nature of a nuclear reactor. Introducing burnable poisons at specific locations and in specific quantities in a nuclear reactor can slow down the chain reaction and make it easier to control. One beneficial effect of this is increased lifetime of the fuel.

In order to regulate the operation of a nuclear reactor, the quality of the nuclear fuel must be strictly controlled. That is, the amounts and spatial distribution of U-235 and U-238 must be known with a very high degree of accuracy and precision. Thus, before leaving a nuclear fuel fabrication facility, the fuel rods undergo a final inspection to measure the content and distribution of uranium isotopes in the fuel rod. Historically, this measurement has been accomplished by passing the fuel rod through an irradiator where it is bombarded by thermal neutrons. The thermal neutrons induce fission in uranium in the fuel rod (though at a much lower rate than when the fuel rod is operational in a nuclear reactor). After a fission event, many gamma rays are emitted over the subsequent seconds and minutes. Thus, after irradiation, the nuclear fuel rod is passed through a gamma detector assembly where the emitted gamma rays are captured and counted. The number of gamma rays emitted by each section of the fuel rod provides information about the relative concentrations and spatial distribution of U-235 and U-238 in the fuel rod. This information is then compared to the fuel rod design as the final quality control step before the fuel leaves the fabrication facility.

In general nuclear fuel rods can be scanned for variations in enrichment along a length of the rod (i.e., enrichment uniformity) using passive scanning systems or active scanning systems. A passive scanning system detects the natural radiation of the nuclear fuel, while an active scanning system induces additional radiation in the nuclear fuel above that amount radiated naturally and detects that additional radioactivity. Historically, the neutron source in the irradiator of the active scanning system has been a radioactive isotope that naturally emits neutrons, specifically californium-252 (Cf-252). Cf-252 emits neutrons with a spectrum of energy that peaks around 1 MeV. The neutrons then need to be moderated or "thermalized" to lower energies where the probability of inducing a fission reaction in the fuel rod is much higher. This is accomplished by putting the Cf-252 inside a block of moderator material (typically heavy water, graphite, or polyethylene). When neutrons interact with these materials, they slow down by "bouncing off" of the nuclei of atoms in the moderator material. A typical neutron will "bounce" dozens of times before reaching thermal energy levels. A thermal neutron has a much higher probability of being absorbed by the nuclear fuel and inducing a fission event, which ultimately leads to the production of gamma rays and a measureable signal at the detectors.

Cf-252 has a half-life of 2.64 years, which means the Cf-252 in the active fuel rod scanners (i.e., fuel rod scanners using neutrons) must be replaced approximately every two years to maintain a high neutron output. Over the past several years, the price of Cf-252 has increased by more than ten-fold, making it price-restrictive to use this isotope to generate neutrons for active fuel rod scanning. Fuel rod fabricators are actively looking for alternative high yield sources of neutrons to perform the final critical quality control step before the fuel rods leave the fabrication facility.

The scanning of fuel rods that contain burnable poisons presents a particular challenge when it comes to determining uranium and plutonium content and spatial distribution. The burnable poisons have very high absorption cross sections for thermal neutrons—much higher than the cross sections for inducing fission in the uranium. Thus, when fuel rods containing burnable poisons pass through the irradiator, most of the neutrons are absorbed by the poison material and a minimal amount of fission is induced in the uranium in the fuel rod. This results in a very low signal at the gamma detectors that is insufficient to determine the U-235 and U-238 concentrations and distributions in the fuel pellets.

A need exists for improved technology, including technology related to a new type of active fuel rod scanner and method for performing active scanning on nuclear fuel rods.

SUMMARY

An exemplary embodiment relates to a system for performing active scanning on a nuclear fuel rod includes an electrically-driven neutron generator, a moderator, a first fuel rod channel, and a plurality of radiation detectors. The neutron generator includes an ion source, an accelerator, and a target. The moderator surrounds the neutron generator and moderates neutrons generated by the neutron generator. The first fuel rod channel disposed within the moderator. The first fuel rod channel receives a first nuclear fuel rod and subjects the first nuclear fuel rod to a predetermined neutron flux. Neutrons induce a secondary radiation of prompt and delayed gamma emissions, neutron emission, or a combination thereof that are detected by the plurality of radiation detectors to determine an amount of fissile material in the first nuclear fuel rod and a spatial distribution of the fissile material along a length of the first nuclear fuel rod.

In the exemplary embodiment described above, the moderator may include a chamber surrounding the target, a neutron moderator surrounding the chamber, and an additional neutron moderator surrounding the neutron moderator. The target may be a solid target comprised of a material amenable to self-impregnation of deuterium or tritium. The neutron moderator surrounding the chamber may be comprised of graphite, and the additional neutron moderator may be comprised of 5% borated polyethylene. The first fuel rod channel may be configured to receive a nuclear fuel rod containing uranium, plutonium or a combination thereof. The nuclear fuel rod may or may not contain a burnable poison such as gadolinium or boron. The first fuel rod channel may include an internal shell having an outer layer comprised of a burnable poison such as gadolinium or boron and configured to absorb thermal neutrons.

The exemplary embodiment described above may also include at least one additional fuel rod channel (e.g., a second fuel rod channel, a third fuel rod channel, a fourth fuel rod channel, a fifth fuel rod channel, a sixth fuel rod channel, a seventh fuel rod channel, an eight fuel rod channel, etc.) configured to receive a uranium or plutonium nuclear fuel rod that does not contain a burnable poison. The at least one additional fuel rod channel may include an internal thermal shell having an outer layer comprised of aluminum, and an inner layer comprised of polyethylene.

Another exemplary embodiment relates to a method of performing active scanning on a nuclear fuel rod. The method includes generating neutrons with an electrically-driven neutron generator including an ion source, an accelerator, and a target; moderating the neutrons with a moderator surrounding the neutron generator; disposing a nuclear fuel rod in a first fuel rod channel disposed within the moderator; subjecting the nuclear fuel rod to a predetermined neutron flux to induce a secondary radiation of prompt and delayed gamma emissions, neutron emissions, or a combination thereof; and detecting the secondary radiation with a plurality of radiation detectors to determine an amount of fissile material and a spatial distribution of the fissile material along a length of the nuclear fuel rod. The nuclear fuel rod may or may not contain a burnable poison such as gadolinium or boron.

The exemplary embodiment of the method of performing active scanning on a nuclear fuel rod, as described above, may further include disposing at least one additional nuclear fuel rod that does not contain burnable poison in at least one additional fuel rod channel; subjecting the at least one nuclear fuel rod to a predetermined neutron flux to induce a secondary radiation of prompt and delayed gamma and/or neutron emissions; and detecting the prompt and delayed gamma and/or neutron emissions from the at least one nuclear fuel rod with at least one of the plurality of radiation detectors to determine an amount of fissile material and a spatial distribution of the fissile material along a length of the at least one nuclear fuel rod.

In some embodiments, provided herein are systems for performing active scanning on a nuclear fuel rod, the system comprising one or more of each of: an electrically-driven neutron generator including an ion source, an accelerator, and a target; a moderator surrounding the neutron generator and configured to moderate neutrons generated by the neutron generator; a first fuel rod channel disposed within the moderator, the first fuel rod channel configured to receive a first nuclear fuel rod and subject the first nuclear fuel rod to a predetermined neutron flux; and a plurality of radiation detectors. In some embodiments, the system is configured such that, in use, neutrons induce a secondary radiation of prompt and delayed gamma emissions, neutron emission, or a combination thereof that are detected by the plurality of radiation detectors to determine an amount of fissile material in the first nuclear fuel rod and a spatial distribution of the fissile material along a length of the first nuclear fuel rod.

In some embodiments, the first fuel rod channel is configured to receive the first nuclear fuel rod containing a burnable poison. In some embodiments, the first fuel rod channel includes an internal epithermal shell having an outer layer comprised of the burnable poison and configured to absorb thermal neutrons. In some embodiments, the internal epithermal shell further includes an inner layer configured to scatter fast neutrons into an epithermal region, the inner layer being concentric to the outer layer. In some embodiments, the inner layer is comprised of beryllium. In some embodiments, the first fuel rod channel is configured to receive the first nuclear fuel rod containing gadolinium or boron.

In some embodiments of the system, the predetermined neutron flux is an epithermal neutron flux, and epithermal neutrons induce the secondary radiation detected by the plurality of radiation detectors.

In some embodiments, the ion source is a microwave ion source or an electron-cyclotron resonance (ECR) ion source.

In some embodiments, the target is a solid target comprised of at least one of titanium, copper, zirconium, uranium, palladium or aluminum.

In some embodiments, the moderator includes a chamber surrounding the target, a neutron moderator surrounding the chamber, and an additional neutron moderator surrounding the neutron moderator. In some embodiments, the chamber contains a dielectric solid, liquid or gas. In some embodiments, the chamber contains a fluorinert liquid. In some embodiments, the neutron moderator surrounding the chamber is comprised of graphite, $D_2O$, or polyethylene. In some embodiments, the additional neutron moderator is comprised of polyethylene. In some embodiments, the additional neutron moderator is comprised of 5% borated polyethylene.

In some embodiments, the first fuel rod channel includes an internal epithermal shell having an outer layer comprised of the burnable poison and configured to absorb thermal neutrons.

In some embodiments, the systems further comprise a second fuel rod channel configured to receive a second nuclear fuel rod and subject the second nuclear fuel rod to a predetermined thermal neutron flux. In some embodiments, the second fuel rod channel is disposed within the moderator, and thermal neutrons induce a secondary radiation of gamma emissions, neutron emission, or a combination thereof in the second nuclear fuel rod that are detected by at least one of the plurality of radiation detectors to determine an amount of fissile material and a spatial distribution of the fissile material along a length of the second nuclear fuel rod. In some embodiments, the second fuel rod channel includes an internal thermal shell having an outer layer comprised of aluminum, and an inner layer comprised of polyethylene.

In some embodiments, the systems further comprise at least one additional fuel rod channel configured to receive a nuclear fuel rod and subject the nuclear fuel rod to an epithermal neutron flux or a thermal neutron flux. In some embodiments, neutrons of the epithermal neutron flux or the thermal neutron flux induce a secondary radiation of gamma emissions, neutron emission, or a combination thereof in the nuclear fuel rod that are detected by at least one of the plurality of radiation detectors to determine an amount of fissile material and a spatial distribution of the fissile material along a length of the nuclear fuel rod.

In some embodiments, the target is a solid target comprised of titanium; the neutron moderator is comprised of graphite; the additional neutron moderator is comprised of borated polyethylene; the first fuel rod channel includes an internal epithermal shell having an outer layer comprised of gadolinium and configured to absorb thermal neutrons, and an inner layer comprised of beryllium and configured to scatter fast neutrons into an epithermal energy region; the first fuel rod channel is configured to receive a nuclear fuel rod containing gadolinium; the second fuel rod channel includes an internal thermal shell having an outer layer comprised of aluminum, and an inner layer comprised of polyethylene; and/or the second fuel rod channel is configured to receive a nuclear fuel rod that does not contain a burnable poison.

In some embodiments, the target is a solid target comprised of titanium; the neutron moderator is comprised of graphite; the additional neutron moderator is comprised of borated polyethylene; the first fuel rod channel includes an internal epithermal shell having an outer layer comprised of boron and configured to absorb thermal neutrons, and an inner layer comprised of beryllium and configured to scatter fast neutrons into an epithermal energy region; the first fuel rod channel is configured to receive a nuclear fuel rod containing boron; the second fuel rod channel includes an internal thermal shell having an outer layer comprised of aluminum, and an inner layer comprised of polyethylene; and/or the second fuel rod channel is configured to receive a nuclear fuel rod that does not contain a burnable poison.

Further provided herein is the use of any of the above systems. In some embodiments, the use comprises use of the system for analysis of a nuclear fuel rod.

In some embodiments, provided herein are methods of performing active scanning on a nuclear fuel rod, the methods comprising one or more of each of: generating neutrons with an electrically-driven neutron generator including an ion source, an accelerator, and a target; moderating the neutrons with a moderator surrounding the neutron generator; disposing a first nuclear fuel rod in a first fuel rod channel disposed within the moderator; subjecting the first nuclear fuel rod to a predetermined neutron flux to induce a secondary radiation of prompt and delayed gamma emissions, neutron emissions, or a combination thereof; and detecting the secondary radiation with a plurality of radiation detectors to determine an amount of fissile material and a spatial distribution of the fissile material along a length of the first nuclear fuel rod. In some embodiments, the first nuclear fuel rod contains a burnable poison. In some embodiments, the first nuclear fuel rod contains gadolinium or boron. In some embodiments, the predetermined neutron flux is an epithermal neutron flux, and epithermal neutrons induce the secondary radiation detected by the plurality of radiation detectors. In some embodiments, the first fuel rod channel includes an internal epithermal shell having a layer comprised of a burnable poison; and wherein subjecting the first nuclear fuel rod to the predetermined neutron flux comprises absorbing thermal neutrons in the outer layer of the internal epithermal shell. In some embodiments, the methods further comprise scattering fast neutrons into an epithermal energy region in the inner layer of the internal epithermal shell. In some embodiments, the methods further comprise disposing a second nuclear fuel rod that does not contain burnable poison in a second fuel rod channel; subjecting the second nuclear fuel rod to a predetermined thermal neutron flux to induce a secondary radiation of gamma emissions, neutron emissions or a combination thereof; and detecting the secondary radiation from the second nuclear fuel rod with at least one of the plurality of radiation detectors to determine an amount of fissile material and a spatial distribution of the fissile material along a length of the second nuclear fuel rod. In some embodiments, the second fuel rod channel includes an internal thermal shell having an outer layer comprised of aluminum and an inner layer comprised of polyethylene, and the methods further comprise reducing an epithermal neutron population with the inner layer and outer layer of the internal thermal shell. In some embodiments, the methods further comprise: disposing a nuclear fuel rod that does not contain burnable poison in at least one additional fuel rod channel; subjecting the nuclear fuel rod to a predetermined epithermal neutron flux or thermal neutron flux to induce a secondary radiation of gamma emissions, neutron emissions or a combination thereof; and detecting the secondary radiation from the nuclear fuel rod with at least another one of the plurality of radiation detectors to determine an amount of fissile material and a spatial distribution of the fissile material along a length of the nuclear fuel rod. In some embodiments, the target is a solid target embedded with deuterium atoms, and wherein generating neutrons with the electrically-driven neutron generator comprises striking the solid target with an accelerated deuterium ion beam to generate neutrons via a deuterium-deuterium fusion reaction. In some embodiments, the methods further comprise replenishing the deuterium atoms embedded in the solid target by irradiating the solid target with the accelerated deuterium ion beam. In some embodiments, the solid target is comprised of at least one of titanium, copper, zirconium, uranium, palladium or aluminum. In some embodiments, the moderator includes a chamber surrounding the target, a neutron moderator surrounding the chamber, and an additional neutron moderator surrounding the neutron moderator, and wherein moderating the neutrons with the moderator comprises using the neutron moderator to thermalize neutrons generated with the electrically-driven neutron generator, and absorbing thermalized neutrons with the additional neutron moderator. In some embodiments, the neutron moderator surrounding the chamber is comprised of graphite, $D_2O$, or polyethylene, and the additional neutron moderator is comprised of polyethylene.

In some embodiments, the chamber contains a dielectric solid, liquid or gas. In some embodiments, the chamber is a fluorinert chamber containing fluorinert liquid.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology is for the purpose of description only and should not be regarded as limiting. An effort has been made to use the same or like reference numbers throughout the drawings to refer to the same or like parts.

As discussed above, the conventional method of active fuel rod scanning uses Californium-252 (Cf-252) as the source of neutrons. Referring to the figures in general, a system 100 described in the embodiments below, replaces the Cf-252 neutron source with an electrically-driven neutron generator 10, which will be described in detail in the embodiments below. Using an electrically-driven neutron generator in lieu of a radioactive isotope has multiple benefits, including the elimination of the need to frequently replace/replenish the Cf-252 and the ability to turn off the neutron source when not in use, while maintaining the fast scan speeds and high accuracy associated with Cf-252 based active scanners.

Figure 1:
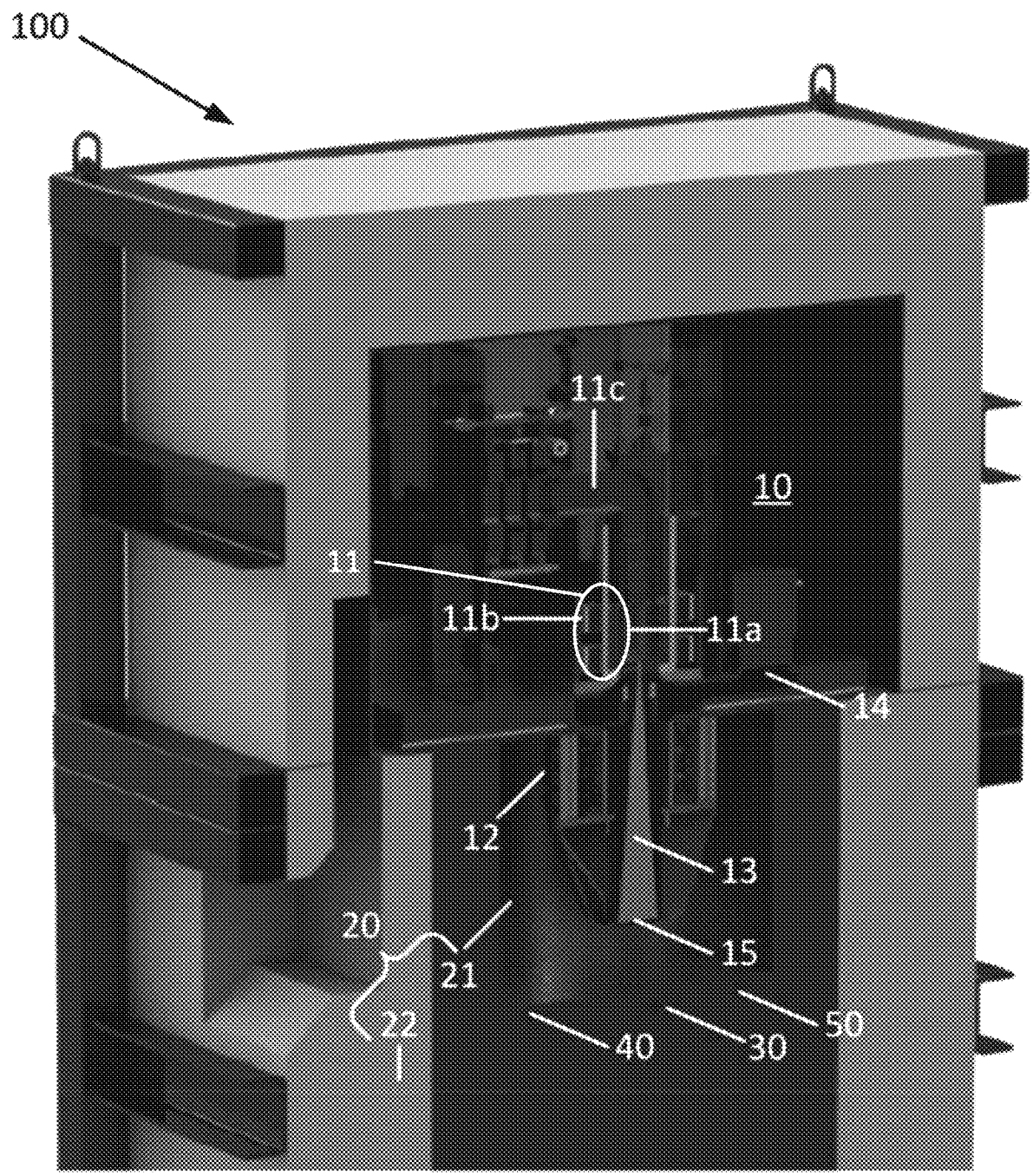
FIG. 1 is a vertical cross-sectional view of a neutron generator and a moderator of a system for generating neutrons via a deuterium-deuterium (DD) fusion reaction and performing active scanning of a nuclear fuel rod containing a burnable poison.

Referring to FIG. 1, a system 100 for generating neutrons via a deuterium-deuterium (DD) fusion reaction and performing active scanning of a nuclear fuel rod containing a burnable poison includes a neutron generator 10 and a moderator 20. To perform active scanning, the neutron generator 10 is configured to bombard the nuclear fuel within a fuel rod with neutrons, thereby inducing a secondary radiation of prompt and delayed gamma and/or neutron emissions and prompt and delayed thermal, epithermal or fast neutrons. This secondary radiation is then counted to determine fissile material content and a level of enrichment along a length of the fuel rod (i.e., a spatial distribution of the fissile material content). Thus, variations in enrichment along a length of the fuel rod can be detected.

Figure 2:
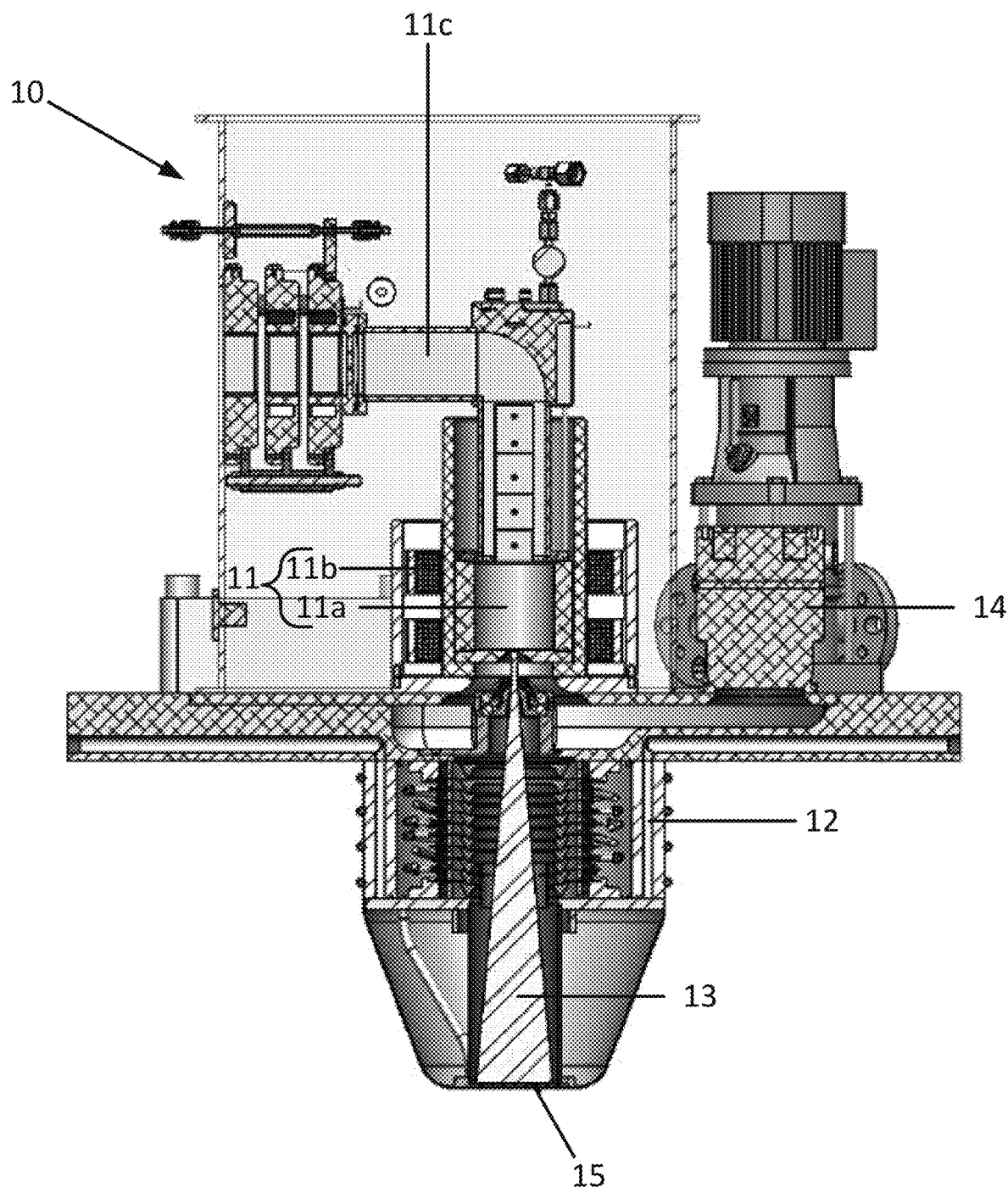
FIG. 2 is a vertical cross-sectional view of the neutron generator of FIG. 1.

FIG. 2 is a cross-sectional view of one embodiment of the neutron generator 10. In one embodiment, the neutron generator 10 includes an ion source 11, an accelerator 12, a deuterium ion beam 13, vacuum pumps 14, and a solid target 15. The neutron generator 10 (described below) is capable of generating up to $2.5 \times 10^{10}$ DD n/s based on a maximum operational voltage of 200 kV and maximum operational beam current of 45 mA. The nominal operational point for the system is approximately 155 kV and 40 mA, which results in a total neutron yield of $1 \times 10^{10}$ DD n/s.

The ion source 11 creates a dense deuterium plasma. The ion source 11 may be, for example, a microwave ion source or an electron-cyclotron resonance (ECR) ion source. In certain embodiments, the ion source 11 has no disposable components, generates very high ion beam current density (e.g., 200 mA/cm$^2$), and has a very long lifetime (e.g., multiple years).

In one example in which the ion source 11 creates a dense deuterium plasma, deuterium gas is continuously injected into a plasma chamber 11a of the ion source 11. A magnetic field, for example, an 875G magnetic field ±20% is generated in the plasma chamber 11a via two magnets 11b. The magnets 11b may be, for example, solenoid electromagnets or permanent magnets. Microwaves having a frequency, for example, of 2.45 GHz±20% generated by a magnetron (not illustrated) are transmitted into the plasma chamber 11a via a coaxial cable and a waveguide 11c, generating a dense deuterium plasma. The waveguide 11c may be any known waveguide, for example, the waveguide described in WO/2015006065, the entire contents of which are hereby incorporated by reference in its entirety for its teachings related to the structure and use of waveguides in neutron generators.

Deuterium ions are extracted from the ion source 11 in the form of a deuterium ion beam 13, and accelerated with an accelerator 12. In particular, positive deuterium ions are extracted from the plasma chamber 11a (ground potential) by the electrostatic potential that is present between a plasma chamber emission aperture and an extraction electrode (e.g., at −40 kV potential). The extracted deuterium ion beam 13 is subsequently accelerated to full voltage (e.g., 150 kV to 200 kV) via the electrostatic potential present in the accelerator 12.

Vacuum pumps 14 are used to maintain low pressure within the accelerator 12 during operation, which improves stability and neutron yield. The vacuum pumps 14 may be part of a differential pumping system configured to maintain a first pressure differential between an outside atmosphere and the ion source/accelerator region, a second pressure differential between the outside atmosphere and the target, and a third pressure differential between the ion source/accelerator region and the target. Examples of such a differential pumping system are described in WO/2009142669 and WO/2011081940, the entire contents of which are hereby incorporated by reference in their entireties for their teachings related to the structure and use of differential pumping systems in neutron generators.

The deuterium ion beam 13 (having a high voltage and a high current) moves through a vacuum and ultimately strikes other deuterium atoms embedded in a solid target 15. Although a solid target may produce fewer neutrons than a gaseous target, use of a solid target results in a smaller and less expensive system, as compared to a system that uses a gaseous target. The solid target 15 may be, for example, a self-impregnating target formed of material(s) that hold onto hydrogen well such that the ion beam can imbed deuterium or tritium ions into the target that serve as the "fuel" for neutron production. Examples of such materials include titanium, copper, zirconium, uranium, palladium and aluminum. Although a pre-loaded target containing deuterium or tritium may be used, once the deuterium or tritium is used up, the target must be replaced. Therefore, it is preferable to use a self-impregnating target that can be "reloaded" with deuterium or tritium by the ion beam, in order to extend the lifetime of the target. In preferred embodiments, the solid target 15 may be a titanium target, a copper target, or a self-impregnating titanium and copper target.

The generated neutrons are born with an average energy peaked tightly around 2.5 MeV. The neutron yield is anisotropic, peaked in the forward direction. The forward-peaked nature of the reaction is beneficial, as it increases the thermal flux at the fuel rods relative to a truly isotropic reaction. A small fraction of the incident ions initiate the deuterium-deuterium nuclear fusion reaction in the solid target 15. When the high energy deuterons interact, nuclear fusion reactions occur that produce high-energy neutrons. These fast neutrons emitted from the solid target 15 interact many times with the surrounding moderator 20, greatly reducing the average energy of the neutron population.

The target 15 sits at high voltage, requiring the cooling jacket surrounding the target 15 to be of an appreciable thickness and contain an electrical insulating material that also acts as a cooling agent. Further, the insulating material needs to assist in the moderation of neutrons, while not having a high propensity for thermal neutron absorption. The selected insulating material is fluorinert (described below), an electrically insulating material which is capable of moderating neutrons without significant low energy neutron absorption. Heat from the neutron-producing target 15 is removed via a circulating fluorinert liquid surrounding the target 15 and accelerator 12, and is ultimately removed from the system via a heat exchanger (not illustrated).

Figure 3:
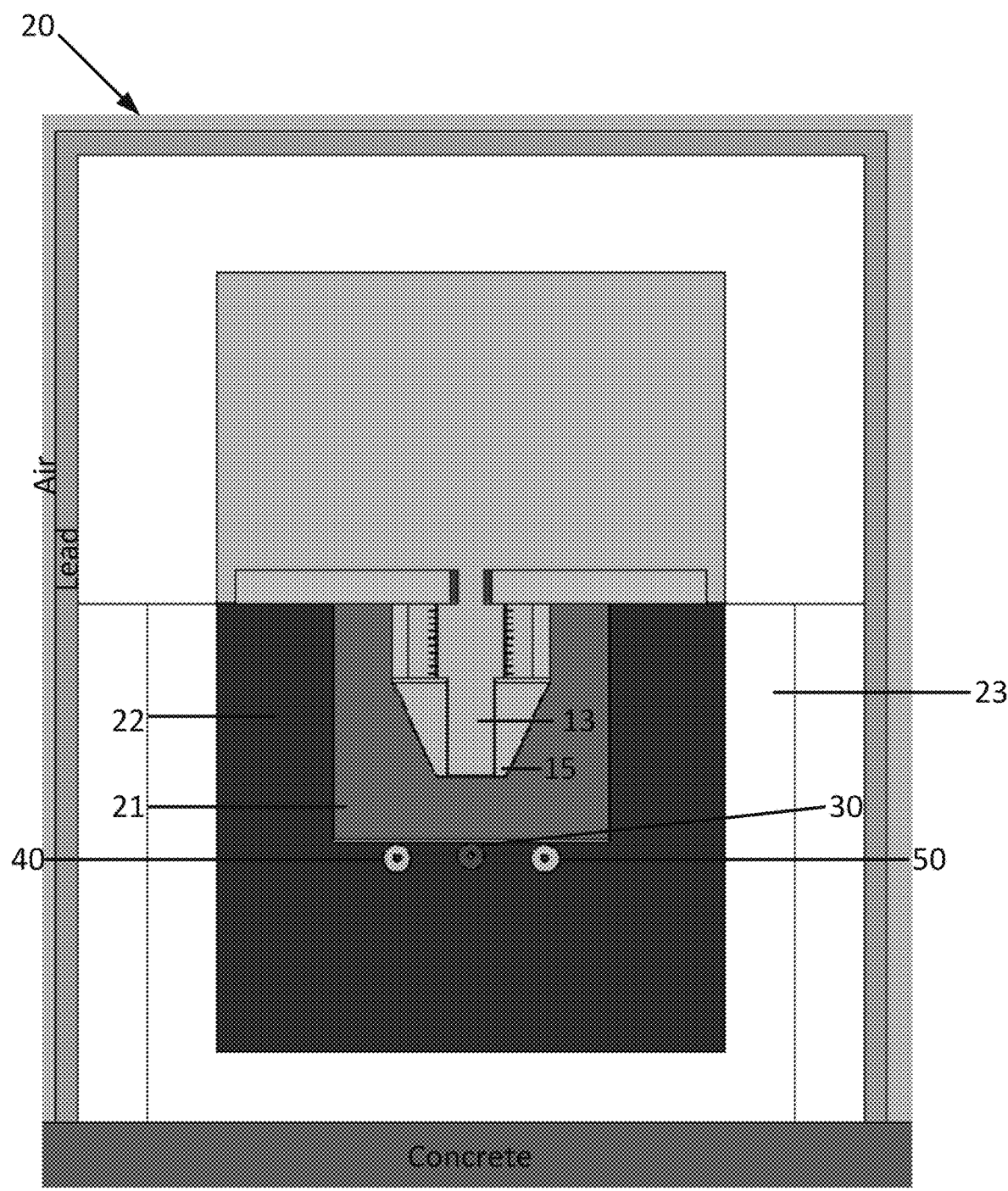
FIG. 3 is a vertical cross-sectional view of the moderator of FIG. 1 illustrating a first fuel rod channel, a second fuel rod channel, and a third fuel rod channel.

FIG. 3 illustrates a cross-sectional view of one embodiment of the moderator 20. The solid target 15 is surrounded by a chamber 21, which acts as an electrical insulator for the solid target 15 floating at high voltage, as well as an initial neutron moderator. The chamber 21 may contains a dielectric solid, liquid or gas. For example, the chamber 21 may be a fluorinert chamber containing fluorinert liquid. In other examples, the chamber 21 may contain oil or sulfur hexafluoride. Surrounding the chamber 21 is a neutron moderator 22. The neutron moderator 22 may be made, for example, of polyethylene, water extended polyethylene (WEP), high density polyethylene (HDPE), graphite, $D_2O$ (heavy water), water, or a combination thereof. In the example of FIG. 3, the neutron moderator 22 is a graphite chamber. Graphite is known to have an extremely low neutron capture cross section and is thus, ideal for achieving very low energies (e.g., <0.025 eV) with high efficiency. The moderator 20 also includes an additional neutron moderator 23. The additional neutron moderator 23 may be, for example, any material including a form of polyethylene such as high density polyethylene (HDPE). In the example of FIG. 3, the surrounding material is a 5% borated high density polyethylene (HDPE) blanket, which assists in the thermalization and capture of neutrons that escape the moderating region (i.e., the chamber 21 and the neutron moderator 22) in order to keep the neutron dose outside of the system at safe levels. In FIG. 3, the base of the additional neutron moderator 23 rests upon concrete, while the other sides of the additional neutron moderator 23 are exposed to atmosphere (i.e., air).

FIG. 3 also illustrates three fuel rod channels: a first fuel rod channel 30, a second fuel rod channel 40 and a third fuel rod channel 50. In the example of FIG. 3, each of the fuel rod channels 30, 40 and 50 are located within the neutron moderator 22. However, the present application is not limited in this regard. In other examples, the first fuel rod channel 30, the second fuel rod channel 40 and the third fuel rod channel 50 may be located in different locations. For example, the first fuel rod channel 30, the second fuel rod channel 40 and the third fuel rod channel 50 may all be located within the chamber 21; two of the first fuel rod channel 30, the second fuel rod channel 40 and the third fuel rod channel 50 may be located within the chamber 21, while the remaining fuel rod channel is located in the neutron moderator 22; or two of the first fuel rod channel 30, the second fuel rod channel 40 and the third fuel rod channel 50 may be located within the neutron moderator 22, while the remaining fuel rod channel is located in the chamber 21.

Figure 4:
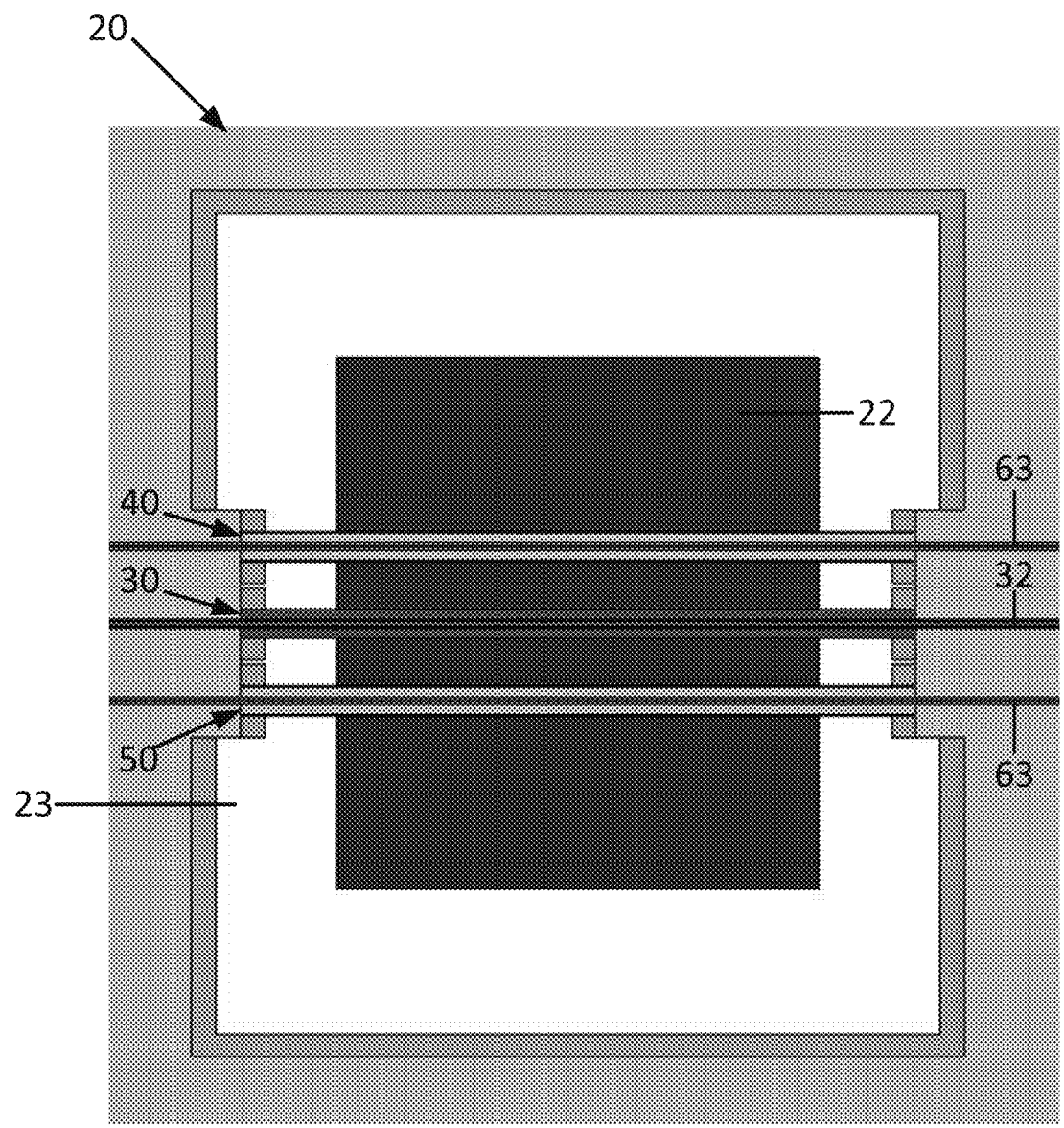
FIG. 4 is a horizontal cross-sectional view of the moderator of FIG. 1 cutting through the fuel rod channel locations of FIG. 3.

Referring to the example of FIG. 3, the first fuel rod channel 30 is located at substantially a same height as the height at which the second fuel rod channel 40 and the third fuel rod channel 50 are provided. The present application is not limited in this regard. In other examples, the first fuel rod channel 30 may be located at a height greater than the height at which the second fuel rod channel 40 and the third fuel rod channel 50 are provided such that the first fuel rod channel 30 is closer to the solid target 15 than the second fuel rod channel 40 and the third fuel rod channel 50. The first fuel rod channel 30, the second fuel rod channel 40 and the third fuel rod channel 50 may all be provided at different heights with respect to one another. In the example of FIG. 3, the first fuel rod channel 30 is equidistant from the second fuel rod channel 40 and the third fuel rod channel 50 (e.g., in the middle of the second fuel rod channel 40 and the third fuel rod channel 50, although at a different height). In other examples, the first fuel rod channel 30 may be closer to the second fuel rod channel 40 than the third fuel rod channel 50, or the first fuel rod channel 30 may be closer to the third fuel rod channel 50 than the second fuel rod channel 40. In the example of FIG. 3, the first fuel rod channel 30, the second fuel rod channel 40 and the third fuel rod channel 50 are provided at the same height and are parallel with respect to one another. FIG. 4 illustrates the parallel first fuel rod channel 30, second fuel rod channel 40 and third fuel rod channel 50 in a top down view of a cross section of the moderator 20.

Although only three fuel rod channels are illustrated in FIG. 3, in other embodiments, it is possible that a different number of fuel rod channels (e.g., one, two, four, five, etc.) can be provided. In some embodiments, a plurality of fuel rod channels may be provided within the chamber 21. In some embodiments, a single fuel rod channel may be provided within the neutron moderator 22.

The first fuel rod channel 30 is configured to receive a removable hollow shell 31 designed for actively testing fuel rods. The shell 31 may be, for example, an epithermal shell designed for actively testing fuel rods with epithermal neutrons. A predetermined neutron flux (i.e., epithermal or thermal) flux at the first fuel rod channel 30 is about 1E4 n/cm$^2$/sec to 1E8 n/cm$^2$/sec, for example, 1.38E6 n/cm$^2$/s.

Figure 5:
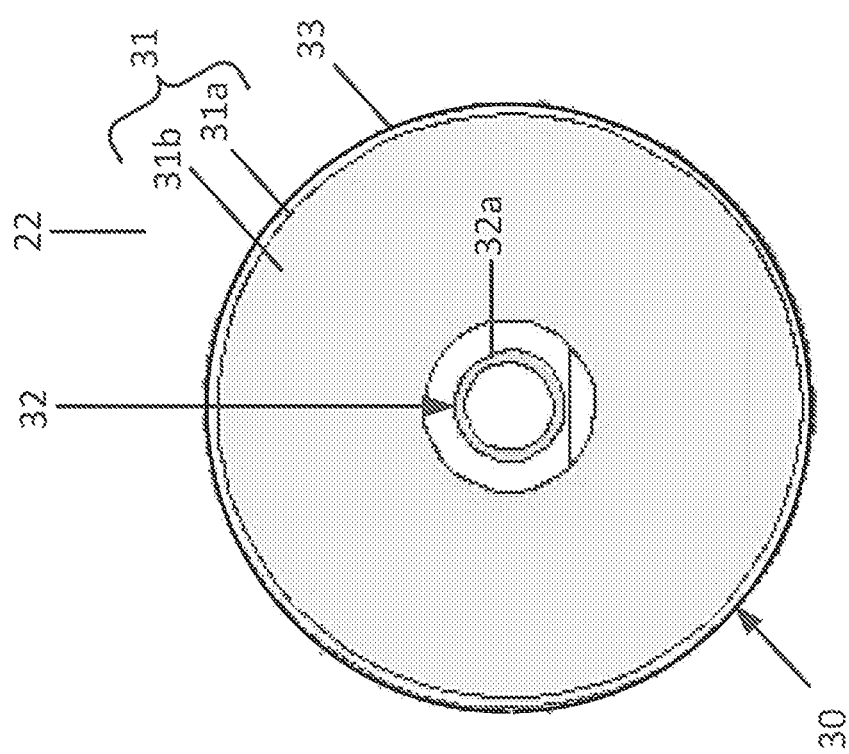
FIG. 5 is a vertical cross-sectional view of the central fuel rod channel of FIG. 3 in which a fuel rod containing a burnable poison has been inserted. The central fuel rod channel may be an epithermal fuel rod channel.

Referring to FIG. 5, in one embodiment, the shell 31 includes an outer layer 31a comprised of a burnable poison (e.g., gadolinium, boron, etc.) or other thermal neutron absorber and configured to absorb thermal neutrons and an inner layer 31b configured to scatter fast neutrons into an epithermal or thermal energy region. The inner layer 31b may be comprised, for example, of beryllium, polyethylene, graphite, or heavy water. The inner layer 31b is concentric to the outer layer 31a. In other embodiments, the inner layer 31b may be omitted. The shell 31 may further include an aluminum sheath 33. The shell 31 is concentric to the aluminum sheath 33. The shell 31 is configured to receive a fuel rod 32. The fuel rod 32 may or may not contain a burnable poison such as gadolinium or boron. For purposes of discussion, the examples described below will focus on uranium fuel rods containing gadolinium, but one of ordinary skill in the art would have understood that the system and methods can also be used to actively test nuclear fuel rods containing uranium, plutonium, or a combination thereof that do not contain a burnable poison; nuclear fuel rods containing plutonium or a combination of uranium and plutonium that also contain gadolinium; or nuclear fuel rods containing uranium, plutonium, or a combination thereof that also contain a different burnable poison such as boron. In the example of FIG. 5, the fuel rod 32 is a uranium fuel rod containing gadolinium (i.e., a GdUO$_2$ fuel rod). The fuel rod 32 may include an outer cladding 32a, for example, a zirconium cladding. The outer cladding 32a is configured to hold in the fuel pellets. A small gap exists between the outer cladding 32a and the inner layer 31b. The outer cladding 32a is typically backfilled with helium.

Figure 6:
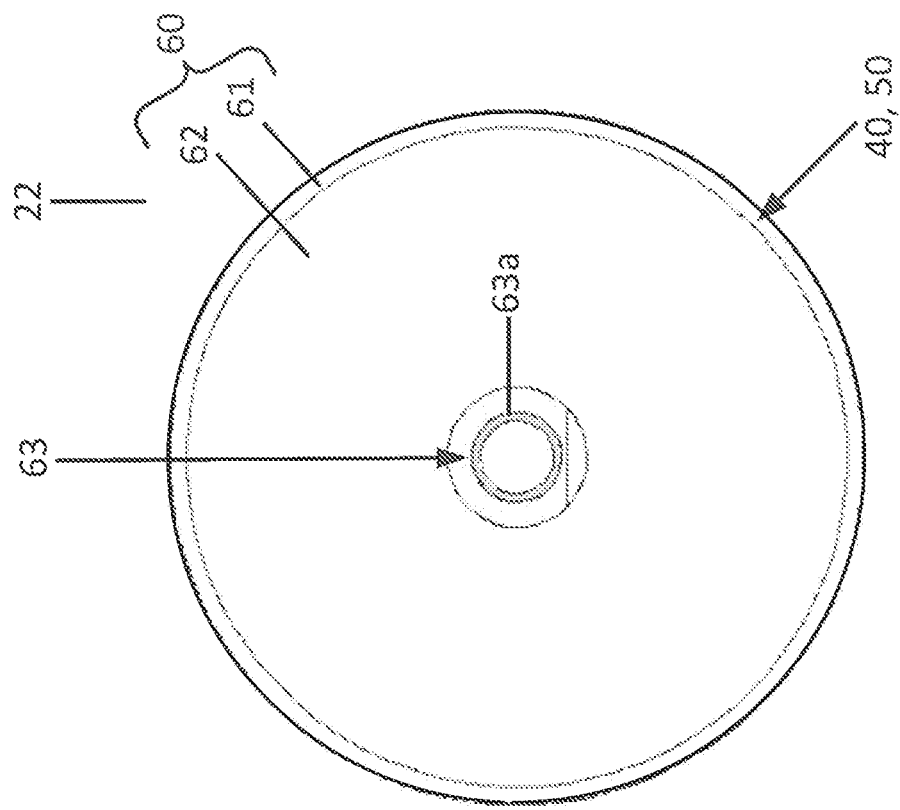
FIG. 6 is a vertical cross-sectional view of one of the second fuel rod channel and the third fuel rod channel (i.e., the fuel rod channels to either side of the central fuel rod channel) of FIG. 3 in which a fuel rod that does not contain a burnable poison has been inserted.

In this example, the second fuel rod channel 40 and the third fuel rod channel 50 are each configured to receive a hollow, thermal shell 60 designed for actively testing standard fuel rods (i.e., fuel rods that do not contain a burnable poison) with epithermal or thermal neutrons. Referring to FIG. 6, in one embodiment, the thermal shell 60 includes an outer layer 61 comprised, for example, of aluminum and an inner layer 62 comprised, for example, of HDPE. The inner layer 62 (e.g., an HDPE blanket) is concentric to the outer layer 61 (e.g., an aluminum sheath). The thermal shell 60 is configured to receive a standard fuel rod 63, for example, a U-235 or U-238 fuel rod (i.e., a UO$_2$ fuel rod). The fuel rod 63 may include an outer cladding 63a, for example, a zirconium cladding. The outer cladding 63a is configured to hold in the fuel pellets. A small gap exists between the outer cladding 63a and the inner layer 62. The outer cladding 63a is typically backfilled with helium. The fuel rod 63 does not contain a burnable poison.

A predetermined neutron flux (i.e., epithermal or thermal) at the second and third fuel rod channels 40, 50 is about 1E4 n/cm$^2$/sec to 1E8 n/cm$^2$/sec, for example, 1.38E6 n/cm$^2$/s, in a configuration in which both the second and third fuel rod channels 40, 50 contain a fuel rod 63. The system was also tested in a configuration where one of the second and third fuel rod channels 40, 50 is empty, and the other of the second and third fuel rod channels 40, 50 contains a fuel rod 63. The thermal flux delivered to the fuel rod 63 was the same as in the case with fuel rods 63 in both the second and third fuel rod channels 40, 50 to an uncertainty of 0.1%. Therefore, the second and third fuel rod channels 40, 50 are decoupled, and the presence or absence of fuel in of the second and third fuel rod channels 40, 50 does not impact the other from a neutronics standpoint.

Figure 7:
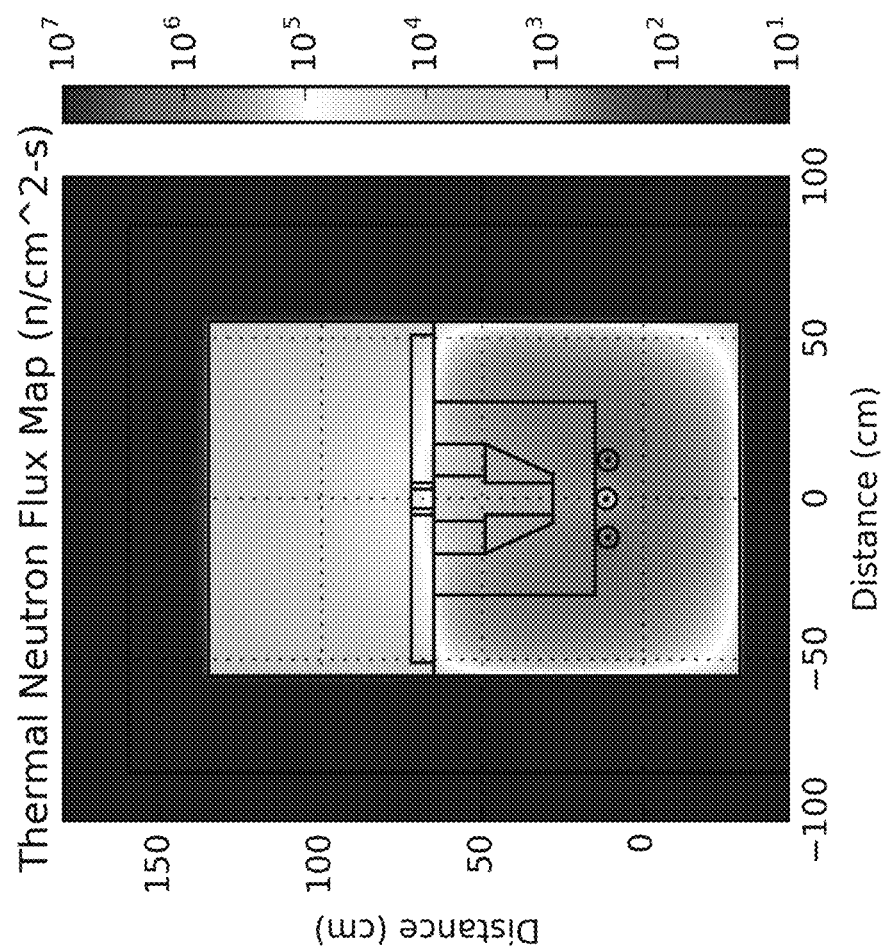
FIG. 7 is a thermal neutron flux map overlaid with the cross-sectional view of the moderator of FIG. 3.
Figure 8:
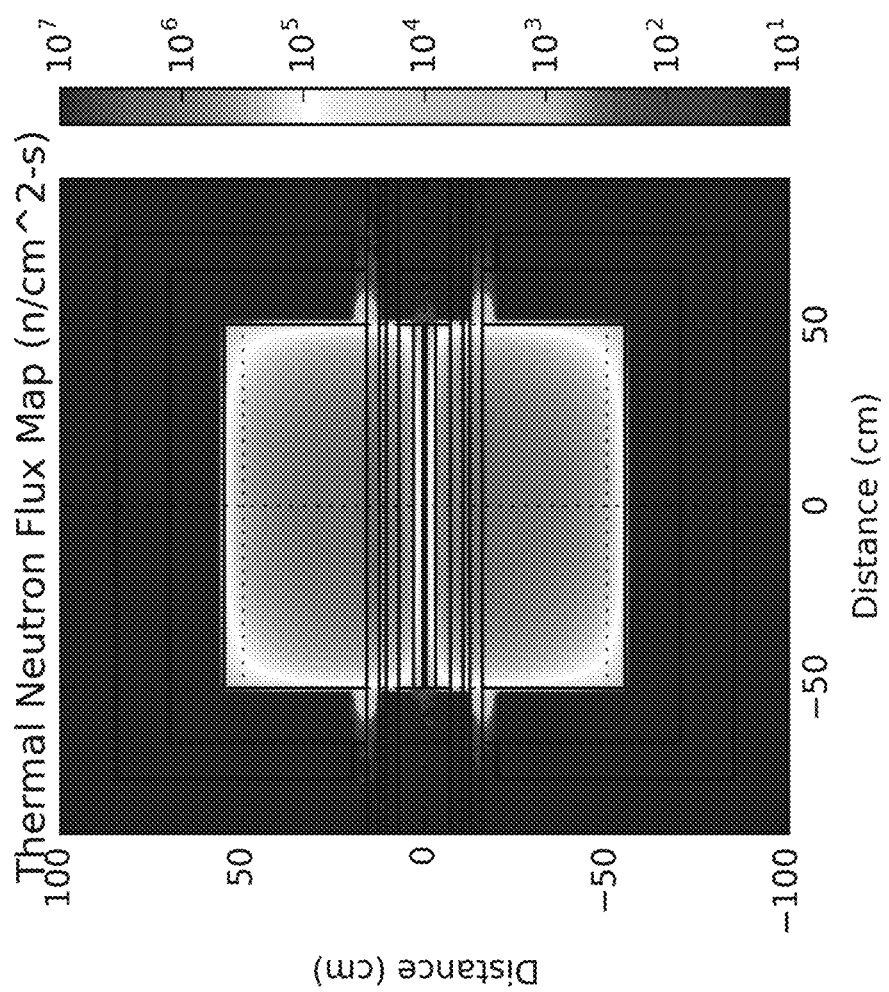
FIG. 8 is a thermal neutron flux map overlaid with the cross-sectional view of the moderator of FIG. 4.

FIGS. 7 and 8 illustrate the thermal neutron flux (E<0.025 eV) in the same planes as shown in FIGS. 3 and 4, respectively. As seen in FIGS. 7 and 8, the neutron moderator 22 (i.e., the graphite chamber) is able to produce a highly uniform environment of thermal neutrons for the second and third fuel rod channels 40, 50. This allows for the fuel rods 63 to spend a longer amount of time in regions of peak thermal neutron population (approximately 30 cm), thus producing higher activation in the fuel and lowering detection times. MCNP simulations show that a configuration in accordance with the embodiments of the present application produces a highly uniform region of thermal neutrons with large thermal neutron flux of about 1E4 n/cm$^2$/sec to 1E8 n/cm$^2$/sec, for example, 1.38E6 n/cm$^2$/s, allowing for improved activation of neutron fuel rods.

Figure 9:
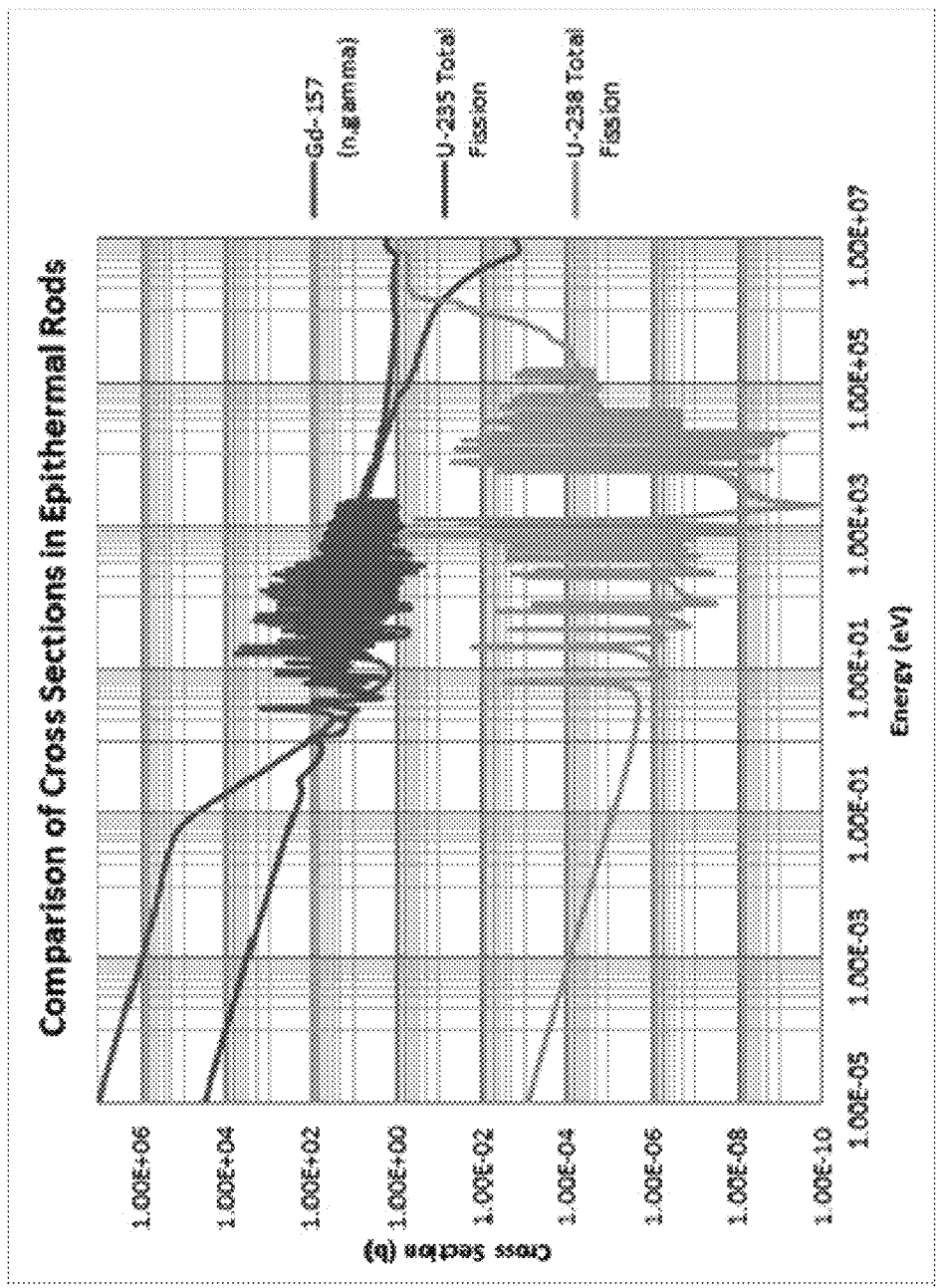
FIG. 9 is a comparison of the absorption cross-section of Gd-157, as well as the total fission cross-sections of U-235 and U-238.

FIG. 9 illustrates a comparison of the absorption cross-sections of Gd-157, U-235 and U-238 over a neutron energy range. As seen in FIG. 9, for epithermal energies (i.e., energies above thermal and below fast), the fission cross section for U-235 and the absorption cross section in Gd-157 are approximately the same. Therefore, the first fuel rod channel 30 for scanning the fuel rod 32 that contains gadolinium is optimized for neutrons above the thermal energy range. This is accomplished, for example, by providing the inner layer 31b comprised of beryllium and the outer layer 31a comprised of gadolinium around the fuel rod 32, thereby creating an effective barrier against thermal neutrons. The thermal neutron flux map of FIG. 7 shows that the thermal neutron population is greatly decreased within the first fuel rod channel 30. Because the first fuel rod channel 30 is closer to the fast neutron source, the total neutron population is higher than at the second and third fuel rod channels 40, 50. Thus, despite the fact that the fission cross section for epithermal neutrons is significantly lower than for thermal neutrons, there is a much larger neutron population to induce those fission reactions. MCNP results indicate that the activity of the fuel rods 32 (containing gadolinium) exiting the first fuel rod channel 30 is approximately half of the activity of the standard fuel rods 63 exiting the second and third fuel rod channels 40, 50. Thus, in at least one embodiment of the present application, twice as many gamma detectors may be provided at the first fuel rod channel 30 than at the second and third fuel rod channels 40, 50. Moreover, a scanning speed of the first fuel rod channel 30 may be slower than the scanning speed of the second and third fuel rod channels 40, 50. For example, the scanning speed of the first fuel rod channel 30 may be about half the scanning speed of the second and third fuel rod channels 40, 50. The scanning speed for each of the first fuel rod channel 30, the second fuel rod channel 40, and the third fuel rod channel 50 may range from 5 to 30 cm/s.

When using epithermal neutrons to induce fission, one has to account for the fact that the U238 fission cross section for epithermal neutrons is significantly higher than for thermal neutrons. Thus, U238 fissions can provide a significant source of background gamma rays if the goal is measuring U235 content, which it is for most cases. This fact provides an upper bound on the ideal energy range for neutrons in the first fuel rod channel 30, which is approximately 1 MeV. Therefore, both thermal and fast neutrons must be screened out as much as possible, creating an effective epithermal population in the fuel rod 32. In order to achieve this, the geometry of the fuel rod channels 30, 40 and 50 and the materials selected is important. In the example of FIG. 3, the geometry of the moderator 20 and the materials described with respect to FIGS. 5 and 6 are configured to maximize the epithermal neutron population (centered around ~1 eV) at the fuel rod channels 30, 40 and 50.

Figure 10:
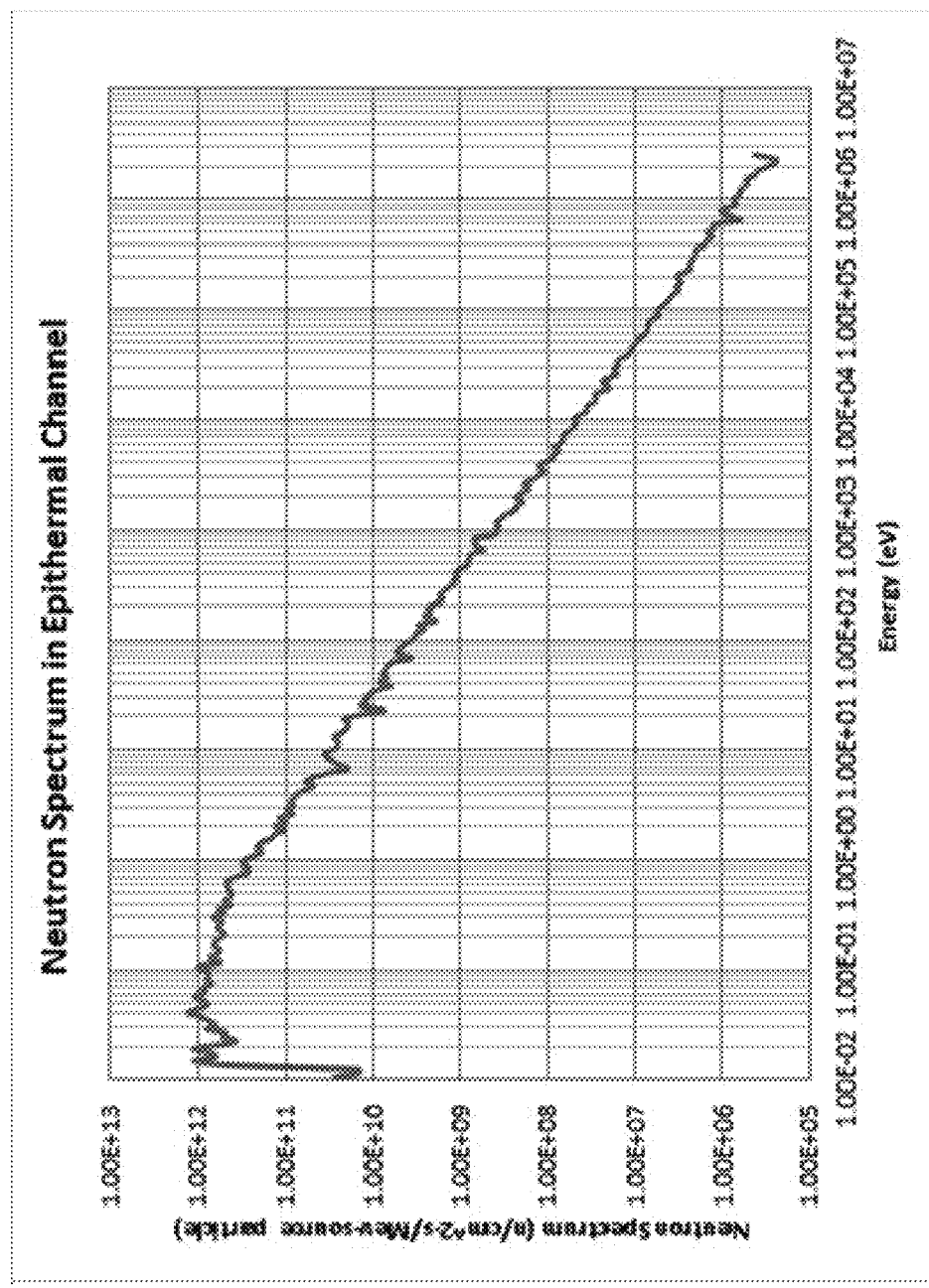
FIG. 10 is a graph showing the neutron energy spectrum output from MCNP at the location of the central fuel rod channel of FIG. 3.

The first fuel rod channel 30 for scanning the fuel rod 32 containing gadolinium must be located far enough from the neutron source to reduce the fast neutron flux population, which is a result of direct transport or single scatter events. It is preferable that the first fuel rod channel 30 be provided in a region very near the maximum epithermal flux, while also being outside of the region of maximum fast flux. This allows for the relative number of fissions induced in U-235 to be significantly larger than those in U-238, effectively increasing the efficiency of the neutrons and reducing the background signal from U-238 activation. FIG. 10 shows a representative neutron energy spectrum output from MCNP at the location of the first fuel rod channel 30 illustrated in FIG. 3. As seen in FIG. 10, the high energy tail is very low compared to the neutron population throughout the epithermal region.

Table 1 depicts the number of U-235 and U-238 activations in the second and third fuel rod channels 40, 50 (i.e., the thermal channels), while Table 2 depicts the number of U-235 and U-238 activations in the first fuel rod channel 30 (i.e., the epithermal channel) for a fuel rod containing 5% atomic natural gadolinium.

TABLE 1

U-235 and U-238 Activation Density in Thermal Lines

| U-235 Enrichment (%) | U-235 Activation Density (Fissions/cm³-s) | U-238 Activation Density (Fissions/cm³-s) | Percent of Fissions from U-235 |
|---|---|---|---|
| 0 | 0.0E+00 | 1.2E+03 | 0% |
| 1.60 | 1.1E+06 | 1.2E+03 | 99.89% |
| 2.40 | 1.6E+06 | 1.2E+03 | 99.93% |
| 3.60 | 2.4E+06 | 1.2E+03 | 99.95% |
| 3.95 | 2.6E+06 | 1.2E+03 | 99.96% |
| 4.40 | 2.9E+06 | 1.2E+03 | 99.96% |
| 4.90 | 3.2E+06 | 1.2E+03 | 99.96% |

TABLE 2

U-235 and U-238 Activation Density in Epithermal Line

| U-235 Enrichment (%) | U-235 Activation Density (Fissions/cm³-s) | U-238 Activation Density (Fissions/cm³-s) | Percent of Fissions from U-235 |
|---|---|---|---|
| 0 | 0.0E+00 | 3.0E+03 | 0% |
| 1.60 | 3.0E+04 | 3.0E+03 | 90.97% |
| 2.40 | 4.5E+04 | 3.0E+03 | 93.72% |
| 3.60 | 6.6E+04 | 3.0E+03 | 95.62% |
| 3.95 | 7.2E+04 | 3.0E+03 | 95.98% |
| 4.40 | 7.9E+04 | 3.0E+03 | 96.34% |
| 4.90 | 8.7E+04 | 3.0E+03 | 96.67% |

As seen in Table 1 (i.e., thermal channels 40, 50), at every enrichment almost every fission event occurring is in U-235. As seen in Table 2 (i.e., epithermal channel 30), the fraction of fissions occurring in U-235 is an order of magnitude higher than U-238, and this level of background can be accounted for by subtracting the known U-238 response, which will vary on the order of fractions of a percent based on the U-235 enrichment of the fuel rod.

Figure 11:
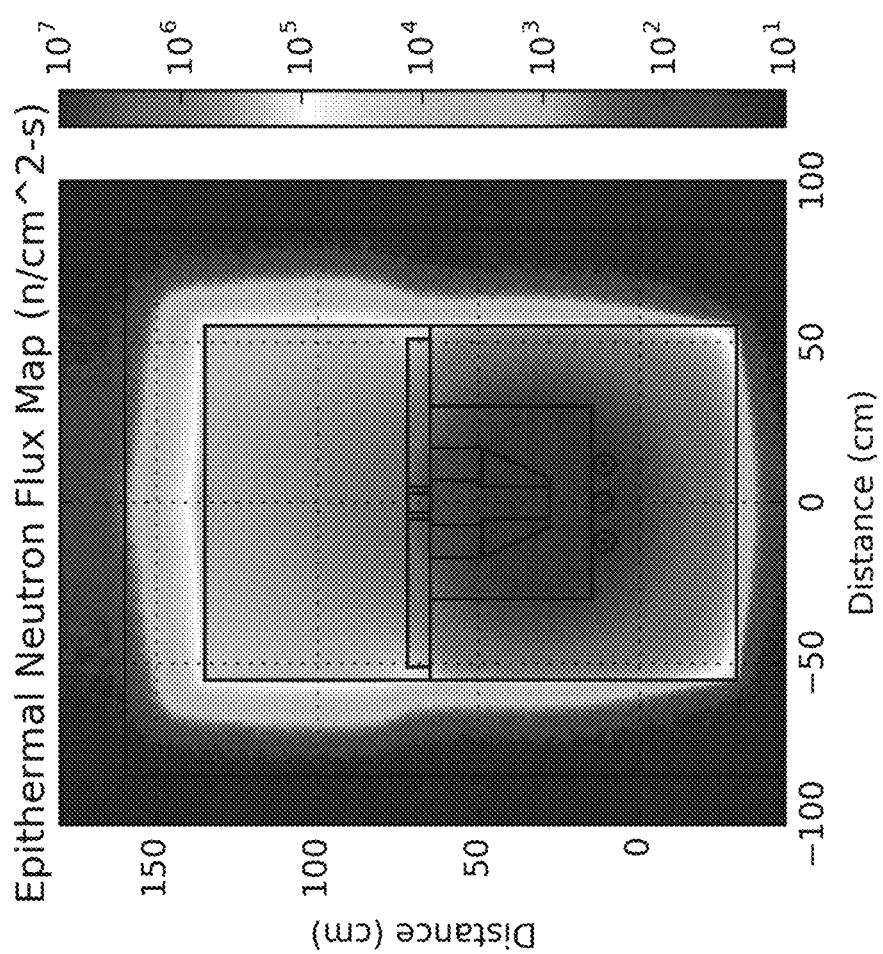
FIG. 11 is an epithermal neutron flux map overlaid with the cross-sectional view of the moderator of FIG. 3.
Figure 12:
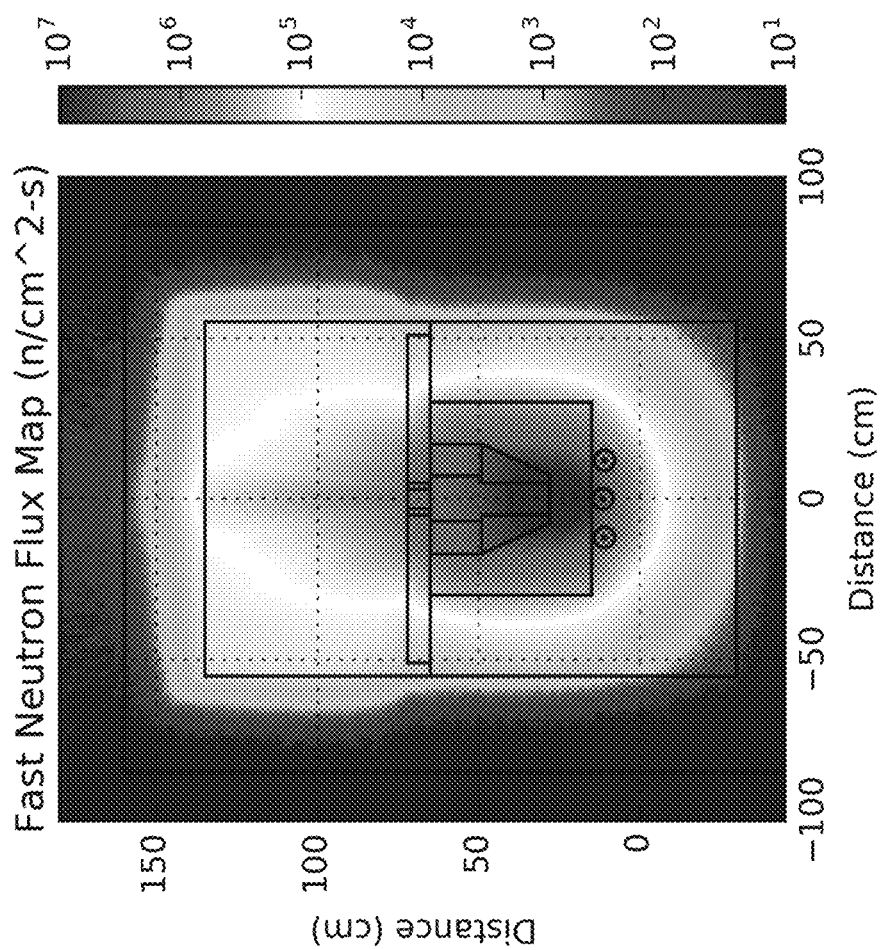
FIG. 12 is a fast neutron flux map overlaid with the cross-sectional view of the moderator of FIG. 3.

FIGS. 11 and 12 illustrate the epithermal neutron flux and fast neutron flux, respectively, for an alternative embodiment of the moderator 20 in which the fuel rod channels 30, 40 and 50 are located at the same height and parallel to one another. In this embodiment, the first fuel rod channel is provided between the second and third fuel rod channels 40, 50 in a position equidistant to the second and third fuel rod channels 40, 50. As seen in FIG. 12, the fast neutron flux at the first fuel rod channel 30 is greatly reduced; however, this comes at the expense of having a lower epithermal neutron flux (see FIG. 11). In other embodiments, at least one of the fuel rod channels 30, 40 and 50 is an epithermal channel, and at least one of the fuel rod channels 30, 40 and 50 is a thermal channel. The epithermal channel(s) may be located at a height equal to, above, or beneath the thermal channel(s).

The cross section for neutron capture by the burnable poison (e.g., gadolinium) in the fuel rod 32 decreases drastically as the neutron energy increases. Thus, by increasing the average energy of the neutron population at the fuel rod channels in the irradiator, the percentage of neutrons that are absorbed by the poison in the rod can be reduced substantially. Furthermore, the reduction in the uranium fission cross section does not decrease nearly as quickly as does the absorption cross section for neutron capture by the poisons as the average neutron energy increases. Thus, by optimizing for epithermal neutron flux at the fuel rod channel locations, the percentage of neutrons that are used to induce fission and produce a measureable signal at the gamma detectors can be increased significantly. This technique makes it possible to utilize active neutron interrogation to measure fissile material content and spatial distribution not only in regular fuel rods, but also in fuel rods that contain burnable poisons, separately or simultaneously.

Figure 13:
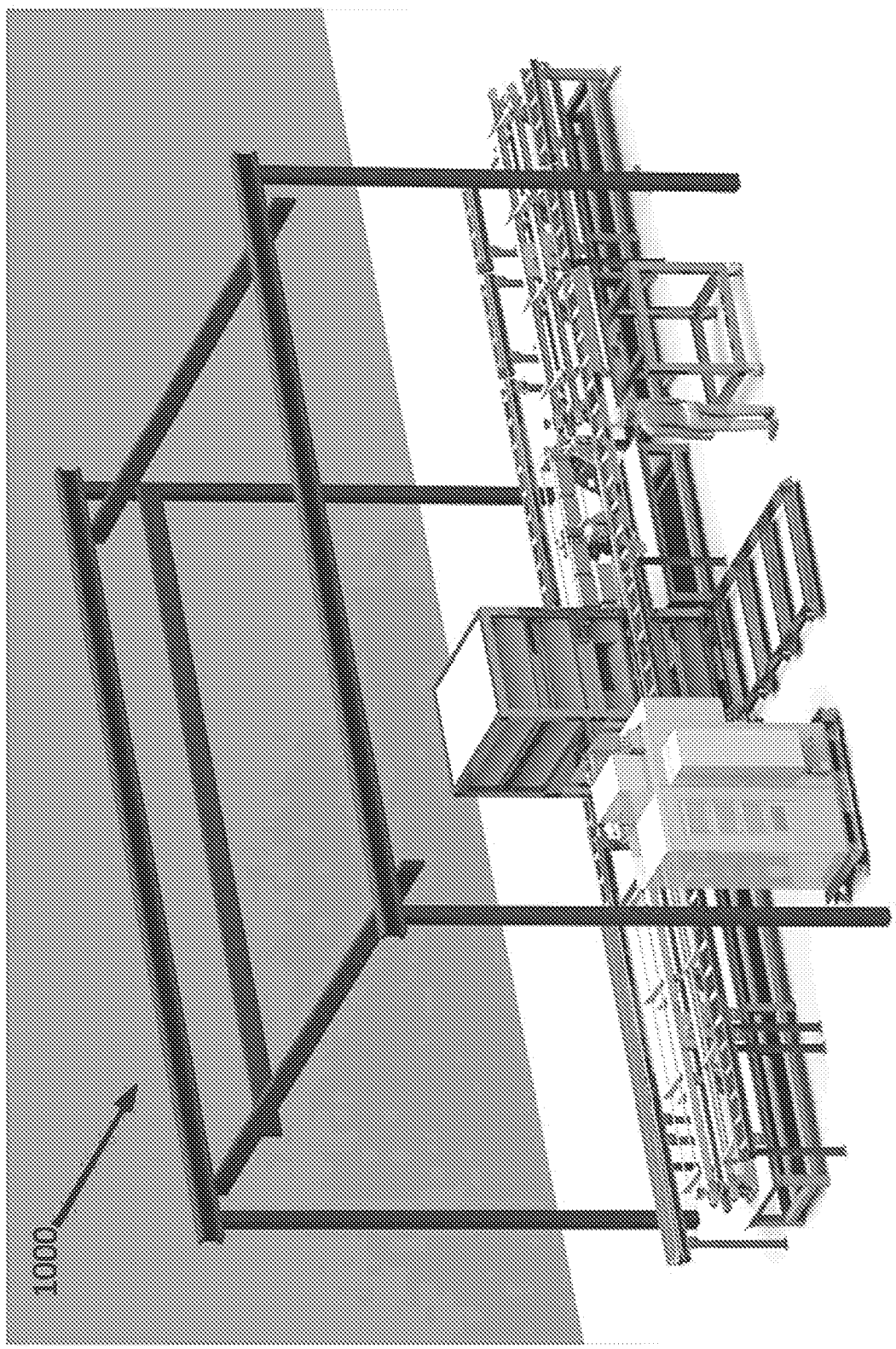
FIG. 13 is an overhead view of an active scanning system including the neutron generator and the moderator of FIGS. 2 and 3, respectively. The computers (not illustrated) used to control the active scanning system are remotely located in a scan control room (not illustrated).
Figure 15:
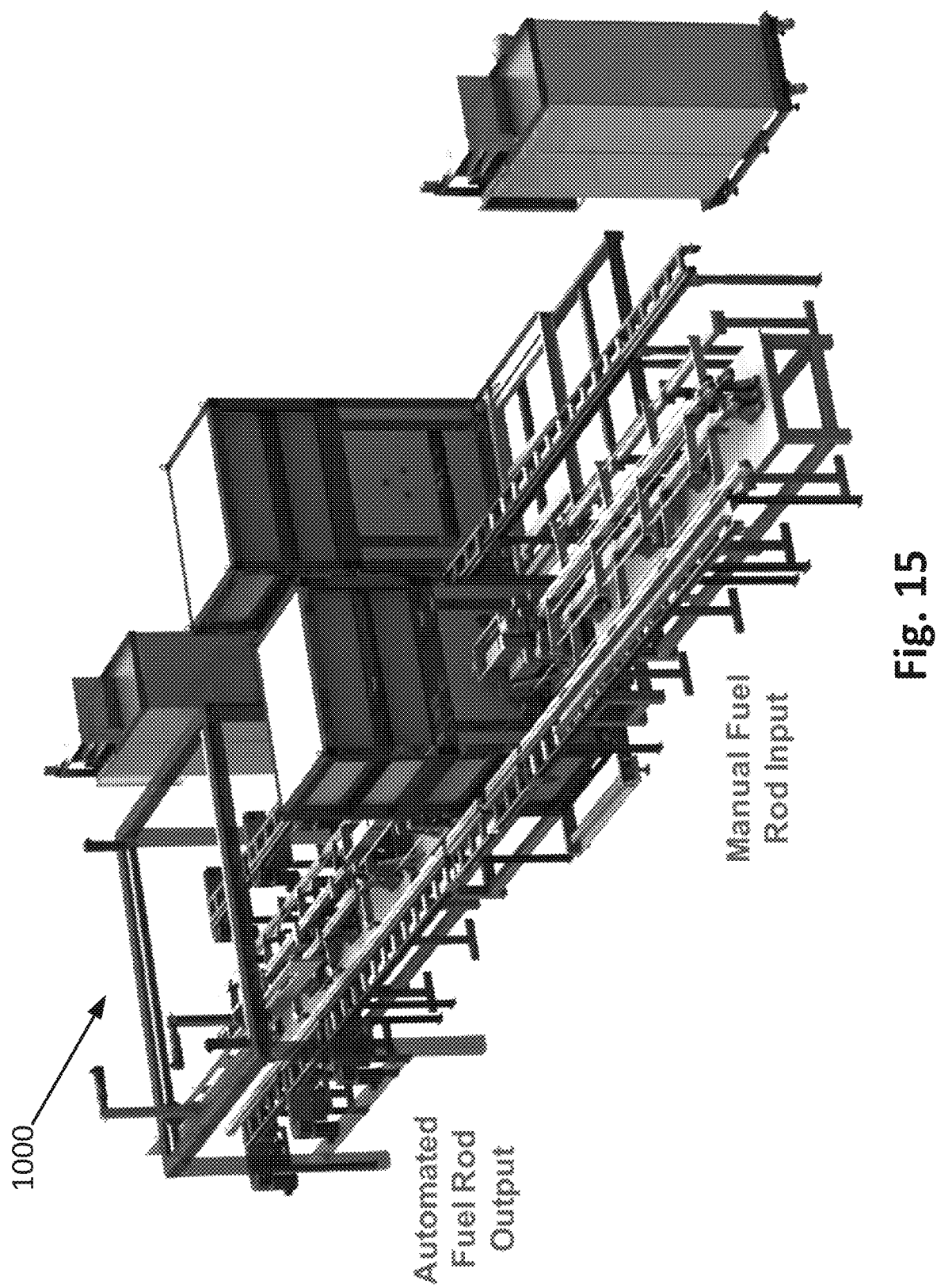
FIG. 15 is a perspective view of the active scanning system of FIG. 13 indicating the areas for manual fuel rod input and automated fuel rod output.
Figure 16:
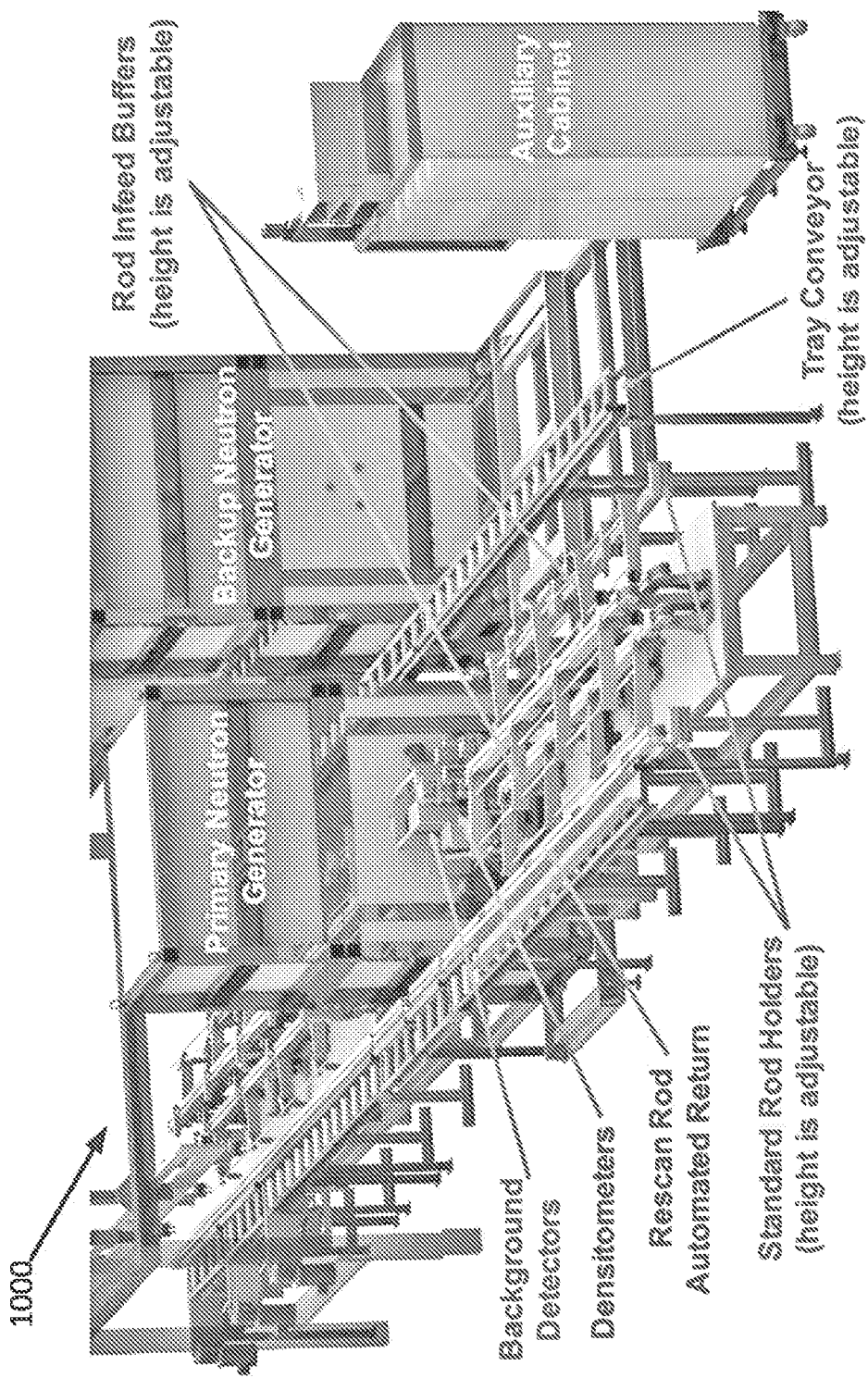
FIG. 16 is another perspective view of the active scanning system of FIG. 13, which has been zoomed in to show the details of the manual fuel rod input of FIG. 15.
Figure 17:
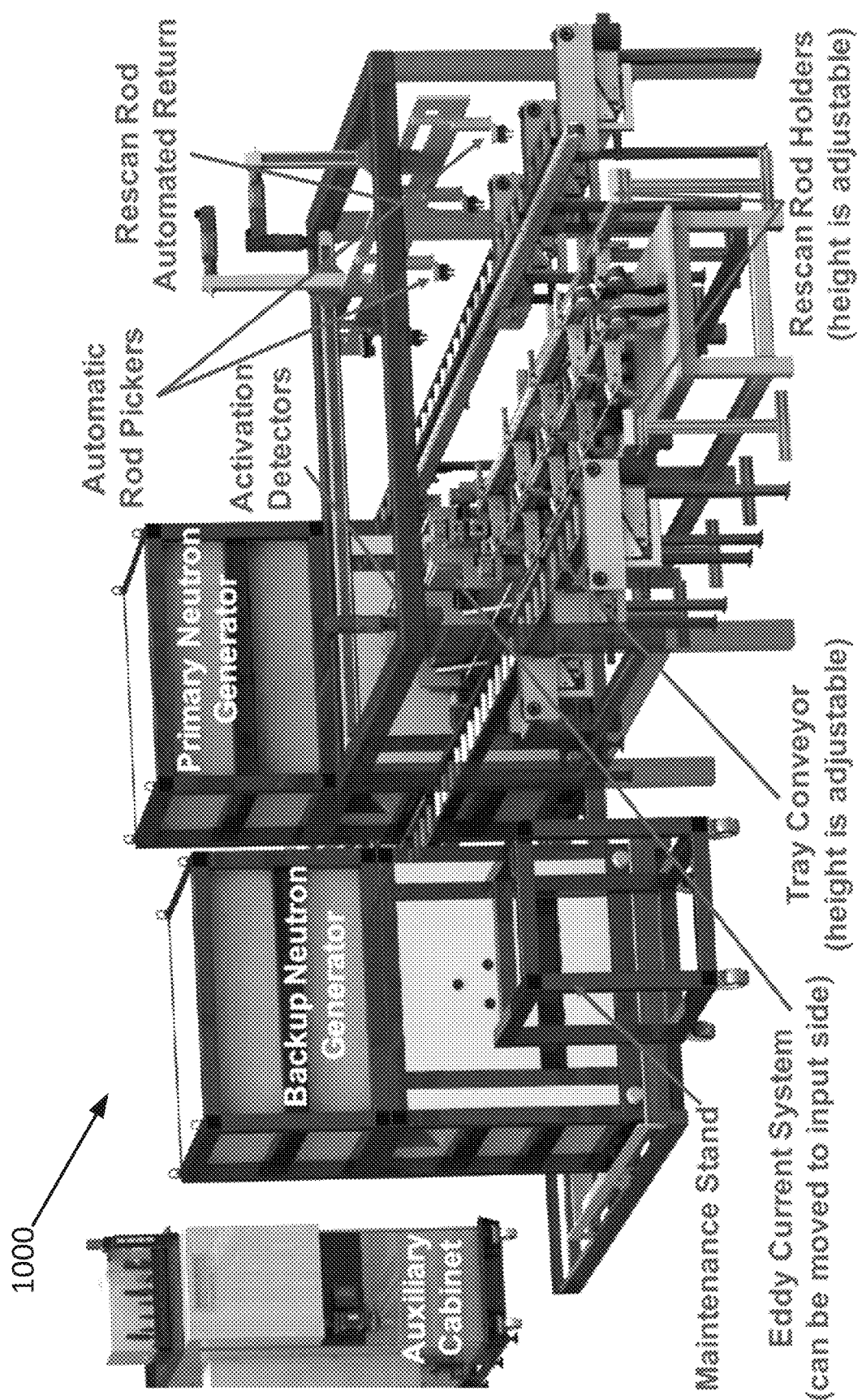
FIG. 17 is a yet another perspective view of the active scanning system of FIG. 13, which has been zoomed in to show the details of the automatic fuel rod output of FIG. 15.

The system 100 described above may be incorporated into an active scanning system 1000, as illustrated in FIG. 13. The active scanning system 1000 is configured to scan standard fuel rods (e.g., $UO_2$ fuel rods 63) and fuel rods containing burnable poison (e.g., $GdUO_2$ fuel rods 32) with a single scanner. In one example, illustrated in FIG. 15, the active scanning system 1000 is configured for manual input of the fuel rods and automated output of the fuel rods that have been scanned. Referring to FIGS. 16 and 17, the active scanning system 1000 may include background detectors, a densitometer, an irradiator, activation detectors, a gadolinia measurement system, rod movement hardware, and all necessary computers, electronics, and software required to operate the system. The detector placement (see FIG. 17) is such that prompt gammas produced by the momentary fission do not affect the activation measurement and only the delayed gamma spectrum is counted. Thus, the uranium fission spectrum of delayed gammas is measured and allows for determination of the percent enrichment, total grams uranium, and any single pellet deviations present in the fuel column. In some embodiments, a background gamma detector is used to measure gamma emission of the rod before irradiation. This background can be subtracted from the delayed gamma signal to improve accuracy and to account for the age of the fuel. Additionally, the proposed scanner measures delayed neutrons to further-refine enrichment data.

Figure 14:
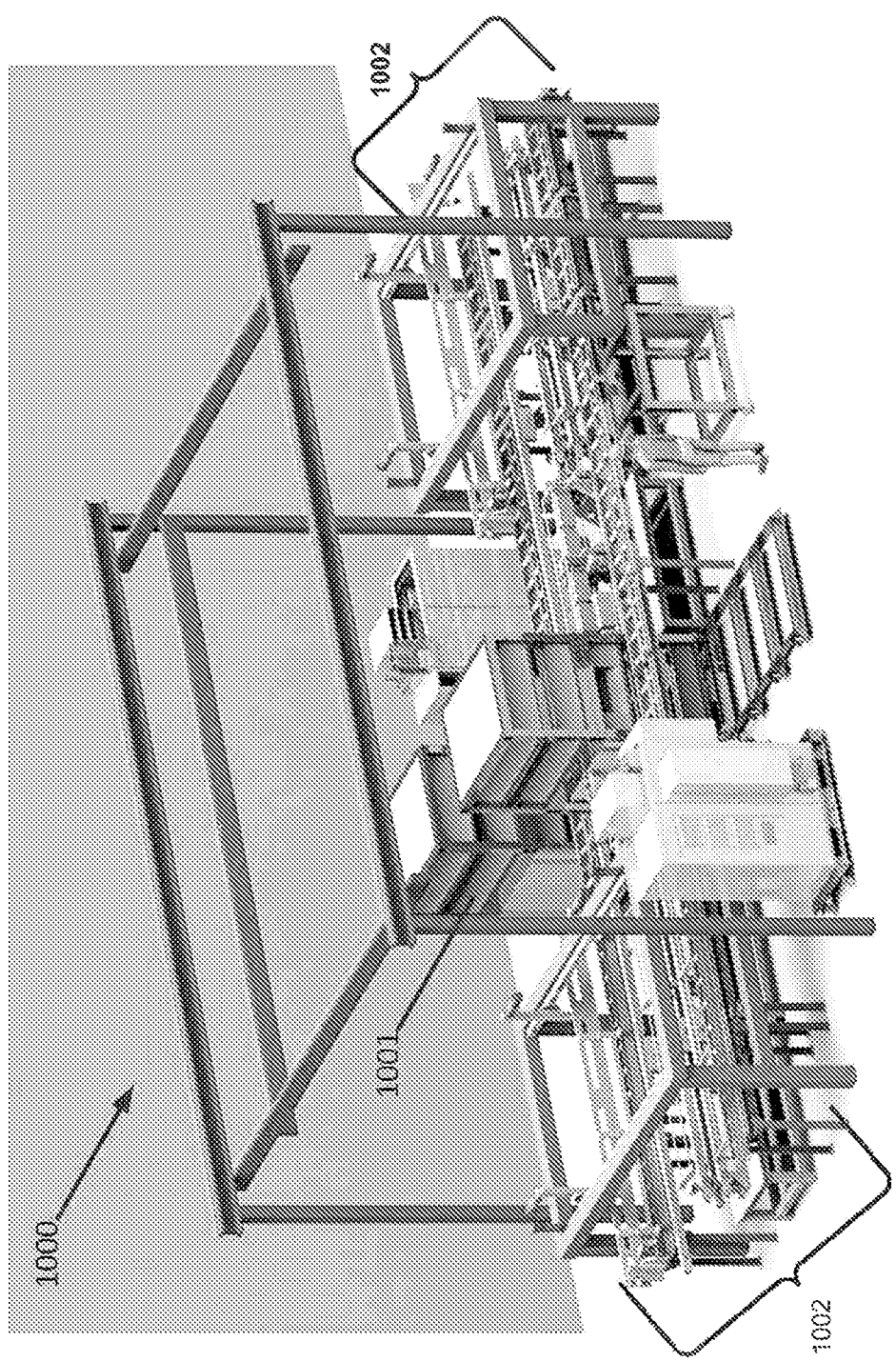
FIG. 14 is an overhead view of the active scanning system of FIG. 13 including a backup irradiator and rod handling hardware.

FIG. 14 illustrates the active scanning system 1000 of FIG. 13 with the addition of the following optional features: a backup irradiator 1001 for redundancy and rapid servicing and a completely automated rod handling equipment 1002 for automatic rod loading/unloading and automatic return of rods requiring a rescan. The backup irradiator may be included to address the risk associated with having a single neutron generator, which could be a single point of failure. In addition to eliminating this risk, the backup irradiator will also increase overall scanner availability by reducing the downtime associated with neutron generator maintenance or repair. The additional rod handling equipment will reduce operator involvement by automating the tray loading and unloading, allowing operators to deliver trays of rods to be scanned to the load/unload zone and to retrieve trays of scanned rods from the same zone. The additional rod handling equipment will also allow the system to automate the quarantine and subsequent re-scan of potentially defective rods.

In the embodiments of the active scanning system described above, the detector placement is such that prompt gammas produced by the momentary fission do not affect the activation measurement and only the delayed gamma spectrum is counted.

Although in the embodiments described above, the nuclear fuel rods were described as uranium fuel rods, the present application is not limited in this regard. In other embodiments, the nuclear fuel rods may be plutonium fuel rods or fuel rods containing uranium and plutonium. In addition, although in the embodiments described above, the burnable poison is gadolinium, the present application is not limited in this regard. In other embodiments, any known burnable poison such as boron may be utilized.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES It should be noted that the orientation of various elements may differ according to other exemplary embodiments, and that such variations are intended to be encompassed by the present disclosure.

It is important to note that the construction and arrangement of the system for performing active scanning of a nuclear fuel rod shown and/or described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

We claim:

1. A method of performing active scanning on a nuclear fuel rod, the method comprising:
   generating neutrons with an electrically-driven neutron generator including an ion source, an accelerator, and a target;
   moderating the neutrons with a moderator surrounding the neutron generator;
   disposing a nuclear fuel rod in a fuel rod channel disposed within the moderator, wherein the fuel rod channel includes an internal epithermal shell having an inner layer and an outer layer, wherein the inner layer is closer to the fuel rod than the outer layer when the fuel rod is in the fuel rod channel, wherein the inner layer is configured to scatter fast neutrons into an epithermal region, and wherein the outer layer is comprised of burnable poison and configured to absorb thermal neutrons;

subjecting the nuclear fuel rod to a predetermined neutron flux to induce a secondary radiation of prompt and delayed gamma emissions, neutron emissions, or a combination thereof; and detecting the secondary radiation with a plurality of radiation detectors to determine an amount of fissile material and a spatial distribution of the fissile material along a length of the nuclear fuel rod.

2. The method of claim 1, wherein the nuclear fuel rod contains a burnable poison.

3. The method of claim 1, wherein the nuclear fuel rod contains gadolinium or boron.

4. The method claim 1, wherein the predetermined neutron flux is an epithermal neutron flux, and epithermal neutrons induce the secondary radiation detected by the plurality of radiation detectors.

5. The method of claim 1, wherein the inner layer is comprised of beryllium.

6. The method of claim 1, further comprising maintaining a pressure differential within the accelerator.

7. The method of claim 1, wherein the ion source is a microwave ion source or an electron-cyclotron resonance (ECR) ion source.

8. The method of claim 1, wherein the target is a solid target comprised of at least one of titanium, copper, zirconium, uranium, palladium or aluminum.

9. The method of claim 1, wherein the moderator includes a chamber surrounding the target, a neutron moderator surrounding the chamber, and an additional neutron moderator surrounding the neutron moderator.

10. The method of claim 9, wherein the chamber contains a dielectric solid, liquid or gas.

11. The method of claim 10, wherein the chamber contains a fluorinert liquid.

12. The method of claim 1, further comprising disposing a second nuclear fuel rod in a second fuel rod chamber disposed within the moderator.

13. The method of claim 12, further comprising subjecting the second nuclear fuel rod to a second predetermined neutron flux to induce a secondary radiation of the second nuclear fuel rod.

14. The method of claim 13, further comprising detecting the secondary radiation of the second fuel rod with at least one of the plurality of radiation detectors to determine an amount of fissile material and a spatial distribution of the fissile material along a length of the second nuclear fuel rod.

15. The method of claim 12, wherein the second fuel rod channel includes an internal thermal shell having an outer layer comprised of aluminum, and an inner layer comprised of polyethylene.

16. The method of claim 12, wherein a scanning speed of the first fuel rod channel is slower than a scanning speed of the second fuel rod channel.

17. The method of claim 1, wherein generating neutrons comprises a total neutron yield of at least $1 \times 10^{10}$ DD n/s.

18. The method of claim 1, further comprising circulating a fluroinert liquid around the target and the accelerator.

* * * * *